(12) United States Patent
Grube et al.

(10) Patent No.: US 10,253,502 B2
(45) Date of Patent: Apr. 9, 2019

(54) APPARATUS AND PROCESS TO CREATE 3-D PATTERN ON MATERIAL

(71) Applicant: POLYGLASS S.p.A., Pointe di Piave (IT)

(72) Inventors: Louis Grube, Deerfield Beach, FL (US); Natalino Zanchetta, Boca Raton, FL (US)

(73) Assignee: POLYGLASS S.P.A., Ponte di Piave, (TV) (IT)

(*) Notice: Subject to any disclaimer, the term of this patent is extended or adjusted under 35 U.S.C. 154(b) by 0 days.

(21) Appl. No.: 15/665,538

(22) Filed: Aug. 1, 2017

(65) Prior Publication Data

US 2018/0058071 A1 Mar. 1, 2018

Related U.S. Application Data

(60) Provisional application No. 62/380,698, filed on Aug. 29, 2016.

(51) Int. Cl.

| | |
|---|---|
| *B05C 19/00* | (2006.01) |
| *E04D 1/26* | (2006.01) |
| *E04D 1/10* | (2006.01) |
| *B29C 64/10* | (2017.01) |
| *B29C 64/20* | (2017.01) |
| *B33Y 30/00* | (2015.01) |
| *B33Y 50/02* | (2015.01) |
| *B33Y 70/00* | (2015.01) |

(Continued)

(52) U.S. Cl.
CPC .............. *E04D 1/10* (2013.01); *B05C 19/00* (2013.01); *B29C 64/10* (2017.08); *B29C 64/20* (2017.08); *B33Y 10/00* (2014.12); *B33Y 30/00* (2014.12); *B33Y 50/02* (2014.12); *B33Y 70/00* (2014.12); *E04D 5/12* (2013.01); *E04D 1/26* (2013.01)

(58) Field of Classification Search
None
See application file for complete search history.

(56) References Cited

U.S. PATENT DOCUMENTS

| | | | |
|---|---|---|---|
| 1,250,577 A | * | 12/1917 | Goldberg ............... B41F 23/08 118/212 |
| 1,368,947 A | | 2/1921 | Levis |
| 1,898,989 A | | 2/1933 | Harshberger |

(Continued)

*Primary Examiner* — Jacob T Minskey
*Assistant Examiner* — Baileigh Kate Darnell
(74) *Attorney, Agent, or Firm* — Donald J. Ranft; Collen

(57) ABSTRACT

The apparatus and process disclosed relates to the application of a pattern on a material such as roof covering or siding where the surface is coated with media to create a three dimensional pattern. The 3-D pattern is created in multiple detailed steps so that the width of the pattern can be of an adjustable size in order to make the pattern more diverse and variable. The apparatus and method disclosed herein utilizes a series of applicator units which apply media in a pattern or without a specific pattern onto the material. The first applicator unit is designed to be the master applicator unit. Each applicator unit can include a separate drive or motor. The apparatus and process disclosed incorporates one or more slave applicator units. These slave pattern applicator units with slave pattern applicator rolls are synchronized to the master pattern applicator roll located in the master applicator unit.

26 Claims, 31 Drawing Sheets

(51) Int. Cl.
*B33Y 10/00* (2015.01)
*E04D 5/12* (2006.01)

(56) References Cited

U.S. PATENT DOCUMENTS

| | | | | |
|---|---|---|---|---|
| 2,000,077 A | * | 5/1935 | Harshberger | D06N 5/00 |
| | | | | 118/203 |
| 2,070,571 A | | 2/1937 | Beasley | |
| 2,142,181 A | | 1/1939 | Croce | |
| 4,295,445 A | | 10/1981 | Kopenhaver | |
| 4,352,837 A | | 10/1982 | Kopenhaver | |
| 4,478,869 A | | 10/1984 | Brady et al. | |
| 4,900,589 A | | 2/1990 | Montgomery | |
| 5,382,291 A | * | 1/1995 | Olioso | D06N 5/00 |
| | | | | 118/212 |
| 5,554,393 A | * | 9/1996 | Uchida | A01J 21/00 |
| | | | | 425/92 |
| 5,597,618 A | * | 1/1997 | Bayer, Jr. | B05C 1/06 |
| | | | | 118/210 |
| 5,814,369 A | | 9/1998 | Bockh et al. | |
| 5,997,644 A | * | 12/1999 | Zickell | B05D 5/06 |
| | | | | 118/308 |
| 6,696,125 B2 | | 2/2004 | Zanchetta et al. | |
| 6,924,015 B2 | | 8/2005 | Zanchetta et al. | |
| 9,212,487 B2 | * | 12/2015 | Kiik | E04D 1/26 |
| 2006/0210714 A1 | * | 9/2006 | Huizinga | B29C 35/0888 |
| | | | | 427/359 |
| 2016/0332191 A1 | | 11/2016 | Pastorutti | |

* cited by examiner

APPARATUS AND PROCESS TO CREATE 3-D PATTERN ON MATERIAL

CROSS-REFERENCE TO RELATED APPLICATION

The present application claims priority to U.S. Provisional Patent Application Ser. No. 62/380,698 filed Aug. 29, 2016 and entitled "SHINGLE IN A ROLL" which is hereby incorporated herein by reference in entirety for all purposes.

BACKGROUND

The two most common asphaltic based shingles offered in the residential roofing market today are called 3-tab shingles and laminated architectural shingles also known as laminated dimensional shingles or just laminated shingles for short. Most residential homes in the United States that have asphaltic shingle roofs that are at least 15 years old were traditionally roofed with the standard 3-tab asphaltic shingles. These 3-tab shingles come in various colors but white and black still dominated the market. Today newer homes and newly reroofed homes across the continental United States are predominately roofed with the newer laminated architectural or designer shingles and the popularity of these laminated dimensional shingles are quickly rising. The reason for the increase in popularity of these laminated design shingles is the aesthetic curb appeal, heavier weights than traditional 3-tab shingles that lead to higher wind uplift ratings, better hail resistance, as well as longer warranties.

The asphaltic 3-tab shingle is so named "3-tab" by roofers, contractors and manufacturers because the 36 inch long shingle is made up of three individual tabs that are each about 12" wide. The 3-tab shingle is manufactured using a substrate or reinforcement that is usually glass, organic felt, basalt, polyester or the like known in the roofing industry. This reinforcement or substrate is often referred to as a mat. This mat is saturated and or coated with asphaltic and or modified asphaltic or modified bitumen compound in one or more steps. The use of a polyester mat in a shingle provides better, tensile, elongation, tear and puncture resistance. The use of a glass or basalt mat in a shingle provides better dimensional stability and fire resistance, particularly fire penetrating the roof deck as compared to when organic felt or polyester is used as a mat in shingles.

In the last 15 years most shingle manufacturers have switched from using organic felt as a substrate or mat to using glass as the substrate or mat. Glass mat is relatively cheap, offers better fire resistance and does not require a dissimilar asphalt to saturate the organic felt during production. Typical organic felt shingles required an asphalt of lower softening point as measured by ASTM D36 Ring and Ball test method and a higher penetration asphalt as measured by ASTM D5 using a needle penetrometer at 25 degrees Celsius. After the felt has been saturated with the softer saturent asphalt it is coated with coating grade oxidized asphalt sometimes referred to as a type III or type IV asphalt. As one can surmise the term saturent asphalt and coating asphalt come from the production of organic felt based 3-tab shingles.

The top side of the 3-tab shingle exposed to the elements is typically covered with #11 size roofing granules of various colors or color blends. These #11 granules are also on other roofing products like modified bitumen rolled roofing and Built Up Roofing (BUR) cap sheets to name a few. The granules are embedded into the upper surface to protect the asphaltic material from UV and solar radiation prolonging the longevity of the material. The color of the granule will depends on the ceramic pigment or pigments used to coat them. The ceramic coating is frequently fired in a kiln to harden and set the ceramic coating to enhance the durability of the granules when exposed to the elements and at times recoated and fired again in a kiln to give the granules a brighter or whiter appearance and a to make the coating more scratch resistant, longer lasting and in general better weathering performance. The colors and frequently the color blends are supplied from companies like Specialty Granule Inc. (SGI) formerly known as International Specialty Products (ISP) or 3M to name a few.

The standard size of roofing granules used to produce the majority of residential shingles in the United States are known as #11 roofing granules but these granules can come in different sizes with predefined sieve gratings. For example #18 granules are smaller than #11 granules and the #11 granules are smaller than the #4 larger granules. The smaller the granule number, the larger the granules are. This is based on the sieves used to define the different granules.

The size and particularly the sieve grating of the granules are very important to the manufacturer in order to achieve as close to full coverage as possible on the top or uppermost asphaltic or modified asphaltic or similar surfaces used in the industry for protection from solar radiation, ultraviolet rays, heat, rain, etc. so that they can warranty their products for their expected life cycle, and to impart the aesthetic look to their products that customers expect at a cost affordable to the consumer. The smaller the granule size the more the base rock needs to be milled, ground or crushed. The milling, grinding or crushing process often requires multiple steps to produce these smaller granules and this means more time, man power and energy is needed for production. Since the standard #11 sized roofing granules are larger in overall size than granules defined as #14 or #18 granules, the #11 sized granules are more economical to manufacture and cost less to the end user than the smaller #14 or #18 granules.

The #18 granules achieve more coverage on the surface of a material because of their size and sieve grating but are not commonly used because of their higher price. Typically the cost of the #18 size granules are often 1.5 or 2 times the cost of the larger #11 standard size roofing granule. Sieve grating ranges by ASTM D451 test method for the #11 standard sized roofing granules and the smaller #14 and #18 sized granules are shown in Table 1 below.

TABLE 1

| | | Typical Ranges Sieve Gradation—ASTM D451 | | | | |
| --- | --- | --- | --- | --- | --- | --- |
| US Sieve Size | Millimeters (mm) | SGI #11 Standard Roofing Granules | 3M #11 Standard Roofing Granules | 3M #14 Small Roofing Granules | SGI #18 Small Roofing Granules | 3M #18 Small Roofing Granules |
| 12 | 1.7 | 4-10 | 4-10 | 0-0.3 | 0-0.5 | 0-0.5 |
| 16 | 1.18 | 30-45 | 30-50 | 0.5-15 | 0-6.0 | 0-6 |

TABLE 1-continued

Typical Ranges Sieve Gradation—ASTM D451

| US Sieve Size | Millimeters (mm) | SGI #11 Standard Roofing Granules | 3M #11 Standard Roofing Granules | 3M #14 Small Roofing Granules | SGI #18 Small Roofing Granules | 3M #18 Small Roofing Granules |
|---|---|---|---|---|---|---|
| 20 | 0.841 | 25-35 | 20-40 | 38-62 | 2.0-26.0 | 2-20 |
| 30 | 0.595 | 14-24 | 10-30 | 23-38 | 48.0-76.0 | 40-80 |
| 40 | 0.425 | 2-9 | 1-10 | 1-18 | 4.0-32.0 | 10-45 |
| PAN | n/a | 0-2 | 0-2 | 0-4 | 0-6.0 | 0-10 |

On the top side of the 3-tab shingle that is not exposed to the elements, natural or non-ceramic colored granules can be used to reduce the cost of the shingle. These non-coated natural colored granules are often referred to as head lap granules in the roofing industry and are typically of the same size as the standard #11 granule used in the exposed areas of the shingle.

The shingle often has an adhesive applied to the granule surface during the manufacturing process that is commonly referred to as shingle tab adhesive so that when the shingles are installed the individual pieces will bond to each other to help prevent blow off of shingles from the roof during a wind event. Sometimes the tab adhesive is applied to the back of the shingle depending on the manufacturer and shingle design.

The shingle tab adhesive is usually activated by heat from the sun after the shingles are applied to the roof. Some manufacturers use a pressure sensitive adhesive (PSA) or combination of a heat activated tab adhesive and a PSA. The roofing contractor may also need to apply a mastic or adhesive in the field in certain roof areas and conditions as needed or appropriate as detailed by the manufacturer of the shingles or by certain code organizations. Standard 3-tab shingles are typically rated for 60 mph winds.

3-tab shingles are usually made on a substrate that can be 1, 2, 3, 4 or even 6 times the width of the final shingles. The wider widths increase productivity and reduce overall manufacturing expenses. Each shingle width on the line is often called a "lane". Each lane passes under or over a cutting cylinder where the tabs are cut out of the shingles to give the 3-tab shingle its distinctive look. The lanes are then slit to the proper width and then cut into pieces approximately 36 inches in length. These cut shingles are then counted, stacked and packaged into bundles. Usually a bundle has enough shingles to roof ⅓ of a roofing square or about 33.3 square feet of roof area. Three bundles typically make up 100 square feet of covered roof area often referred to as a roofing square. 3-tab shingles come with a 15, 20, 25, or 30 year warranty depending on the weight and manufacturer. 3-tab shingles as well as laminated architectural or designer shingles work by shedding water to the shingle below in order to keep a home or residence dry. The pitch or roof slope is important to shedding the water. Typical minimum slope that is recommended by the manufacturer for good performance is usually a slope equal to or greater than 4 inches rise to 12 inches in length or 4" in 12". When the slope is 2 in 12 inches to 4 in 12 inches, usually two layers of underlayment is often required under the shingles to help shed the water and to prevent water from entering the home. Each manufacture has its own recommendations for performance and warranty considerations.

Architectural or dimensional shingles were developed in the 1970's for the high end home market. Home owners were looking for an asphalt shingle product that had the aesthetic appearance of cedar or wood shakes while providing the performance of asphaltic roofing materials. In reality, laminated shingles are actually an enhanced, stronger version of a standard 3-tab shingle and this is why laminated shingles are sometimes called architectural shingles. Architectural shingles are sometimes constructed with a heavier base mat with multiple layers of materials adhered together. This gives the "dimensional" shingles a layered or three dimensional look. Whereas the standard three tab shingle contains a flat layer with no dimensional thickness to it. FIG. 1 shows a picture of a 3-tab shingled roof section.

The appearance of the 3-tab shingle in FIG. 1 is repetitive and looks relatively flat to the eye when viewed up close, from the side or from the street level. The 3-tab shingles were the mainstay of American homes 15 or more years ago because they worked, were relatively economical in comparison to wood shakes, tile or similar roof cover offerings.

Laminated or architectural shingles also known as dimensional or composite shingles are made similarly to 3-tab shingles but unlike a 3-tab shingle, a laminated shingle has an extra layer under its lower half to mimic the look of wood shakes on roofs. This added thickness gives the tabs on a laminated shingle a thickness that is twice the depth of a 3-tab shingle. One of the primary goals of a laminated shingle is to provide a more natural and deeper look than that offered by a conventional 3-tab shingle.

A laminated shingle also creates depth by featuring tabs of varying widths. These cut out shingle tabs are sometimes called dragon teeth because of their shape. When the dragon tooth portion of the laminate shingle is glued to the backer strip the area between the cut out dragon teeth are separated by large, randomly spaced gaps. The large spaces between the cut tabs highlight the thickness of the tabs, creating a visually appealing effect of depth trying to reproduce the look of wood shakes.

The laminate shingles as mentioned previously are formed from cut tab sections of dragon teeth that are combined together with a backer strip. Originally these two pieces were combined together off line after cutting out the individual dragon teeth and individual backer strips. The off line process of gluing the two pieces together was time consuming and labor intensive adding to the high cost of laminate shingles. This off line procedure was used early on during the manufacturing of laminate shingles. Today the two pieces are frequently glued or laminated together in line to combine the two pieces during the manufacturing process. Once the inline combiner was perfected, laminate shingles could be produced faster and more economically and they became affordable and readily available to the homeowner, architect and contractor.

Architectural laminate shingles can weigh almost 50% more than the standard 3 tab shingles. Because of this heavier construction they are less likely to warp and they can provide better wind resistance. Most architectural shingles are rated for 80 mph up to 120 mph wind resistance. Also, the architectural or laminated shingles do a much better job hiding imperfections in the roofing structure. The laminate shingles frequently come with a 30 year warranty and some even have limited life time warranties from the manufacturer.

The advantages to laminate architectural or design shingles are many and include more aesthetically pleasing, better curb appeal due to the different layers and cut out designs with various color shading and tab widths, and often have a longer manufacture warranty due to the layered design and heavier weights. Also laminate shingles generally have a higher wind uplift resistance and usually better resistance to hail impacts. Based on the region and availability, the cost of architectural shingles may only be about 20% more than the traditional 3-tab shingles although some of the higher end 50 year warranty or life time warranty laminated shingles will help shingle products can be almost twice the expense of 3-tab shingles to purchase. A section of a roof with laminate architectural (dimensional) shingles is shown in FIG. 2.

The dimensional look of the laminated architectural shingles is apparent up close, from the side and from the street level. For ease of comparison FIG. 3 shows a section of roof with 3-tab shingles and a section of roof with the laminated architectural shingles placed side by side to show the dimensional differences between the two shingle types.

One of the biggest drawbacks to shingles in general, whether they are 3-tab or laminated architectural shingles, is the number of individual pieces to install, the relatively small size of the shingles themselves, and the time it takes to install all the individual pieces. Manufacturers of shingles and other roof coverings have tried different shapes, designs, attributes and sizes to overcome these drawbacks. It typically takes three bundles of standard 3-tab asphalt shingles to cover one square on a roof. A roofing square is equal to 100 square feet of roof area coverage, so each bundle covers roughly 33⅓ square feet. Heavier 3-tabbed shingles and laminated shingles require four, or sometimes five, bundles to cover a square. When shingles come three bundles to the square, there are roughly 29 standard-sized shingles that are 12 inches wide by 36 inches long in each bundle.

For example, a typical 1500 square foot residential roof would require 15 roofing-squares or approximately 45 bundles of 3-tab shingles. That 1500 square foot roof would require about 1305 three-tab shingles to be properly aligned and installed. Needless to say, installing that number of shingles will require significant labor and time to correctly protect this 1500 square foot roof.

Some manufacturers have tried to design and market membranes or rolled products that can cover 50 or even 100 square feet of residential roofing area at a time. These products are similar to commercial rolled roofing products like BUR cap sheet and modified bitumen rolled membranes. Although somewhat functional, these products have not had good customer or contractor acceptance due to the lack of aesthetic curb appeal since these membranes lack a pattern or design and use only blended or single colored #11 size roofing granules on the top surface. Another reason these products have not gained market share and customer acceptance can be attributed to the difficulty of installing these products on a residential sloped roof particularly products that have low tear resistance.

Some manufactures have tried to produce a roll product with a design that looks like wood shakes, tiles or bricks to reduce the time and labor needed to install a residential roof but these products also lack the aesthetic curb appeal desired by the homeowner or contractor partially due to the appearance and quality of the design. Sometimes the design on these membranes lacked depth and dimension and were relatively flat to the eye or the rolled products have designs and patterns that are of fixed dimensions that repeat and or lack the aesthetic 3-D effect of the emulated design.

When rolls and or membranes are manufactured with a fixed and repetitive design and are installed on residential roofs or the like, they frequently lack aesthetic curb appeal because a zipper line or zig zag effect is often seen in the fixed dimensions of the pattern or design. This diagonal zipper or zig zag line can often be seen in a standard 3-tab shingle roof and is due to the fixed and continuous design dimensions of the shingle tabs themselves. This zipper effect is very apparent and is highlighted with arrows to help identify the issue is shown in FIG. 4.

Another issue to be overcome when manufacturing a continuous sheet or rolled membrane material with a pattern or design on the surface is applying/depositing the media or granules onto the surface of the material in a precise pattern without the granules moving or blending to the point the pattern or design is blurred or marred. Typically, during the manufacturing of rolled roofing membranes or shingles, a continuous sheet of material or substrate made of fiberglass, polyester, organic felt or similar materials known to those familiar to the art of making shingles and rolled roofing membranes is unrolled, then dipped or coated or extruded with a molten or tacky material such as asphalt or modified asphalt or bitumen or thermoplastic or elastomeric polymers or any combination thereof in one or more steps and put through a set of rollers or scrapers to obtain a predefined thickness. Sometimes the tacky material is coated directly to a film or even a release liner or a steel belt or similar apparatus or equipment depending on the design and equipment capabilities. Regardless of how the material is manufactured or if it has a mat or not, the hot molten or semi-molten or even a cold tacky sheet can then move beneath a granule application device. This device typically consists of a hopper or granule applicator or a set of hoppers that hold granules or blended granules, sand, talc or the like and a fluted roll or belt that can meter on a predetermined amount of media or granules or can drop or even meter on an overabundance of media or granules onto the top or exposed upper surface to make sure the material is protected and the aesthetic nature of the material is preserved. Typically the excess granules are removed and often recycled for use. Normally the granules are partially pressed into the surface of the material using a press roller or the like with an opposition roll or the like and/or are partially pressed into the surface of the material through an S-wrap or even possibly through both apparatuses so that the granules can be partially embedded into the surface so that they stay in place once the material is fully cooled or the adhesive is set. Sometimes an overcoat of adhesive or other material or liquid like a clear acrylic coating is added after or before the granules are put onto the material.

In general, rolled products designed for the construction industry for residential and or commercial markets today are simplistic with designs and patterns having the same dimensions that are repeated continuously on the roll or membrane. These patterns or designs try to simulate tile, bricks or even a 3-tab shingle that often lacks the desired curb appeal consumers are looking for. What is needed in the industry is a construction material, membrane or rolled roofing and or siding material that can emulate the varied dimensions of laminated architectural shingles, that is aesthetically pleasing to the consumer, that reduces the amount of pieces applied by the contractor, that can lower labor costs and lower the overall cost of the applied roof or siding system, that does not have a repetitive pattern or design, that is easier to install, have good wind up lift resistance and possibly reduce the amount of hail damage that can occur during a storm. To date no rolled membrane has achieved the look of a 3-D laminated designer shingle until now.

A typical granule application device uses a hopper or media applicator unit and a gate that can have a fluted roll or a belt rotating beneath the hopper or media applicator unit to meter on and allow the granules to fall onto the moving sheet of roofing or siding or similar material or membrane. However, these devices do not adequately control the amount of granules falling or placed onto the material and usually an abundance of granules are added to the material or membrane sheet. The excess granules must be removed during the process causing engineering solutions to reclaim these granules for reuse or to discard. The current granule hoppers or media applicator units and metering devices do not allow the granules to be applied/deposited accurately or in a random, predetermined and predefined pattern.

Montgomery disclosed in U.S. Pat. No. 4,900,589 one example of an application device. This granule application device includes a series of granule applicators and a sheet that travels under the applicators for receiving the granules. Each applicator includes a roll and gate unit for depositing the granules by allowing the granules to just fall to the sheet. This device does not deposit granules in a predefined pattern on the sheet and does not control the dropping of the granules.

Another device is disclosed in U.S. Pat. No. 4,478,869 to Brady, et al. This device includes a series of hoppers for applying granules to a continuously moving strip. This device provides a means for sensing the amount of excess granules collected in a back fall hopper and for monitoring the rate of discharge of the granules to the back fall hopper. However, this device does not provide a system and method that controls the dropping of granules and depositing granules in a pattern on the continuously moving sheet.

Other granule application systems are overly complex and have been unable to simply and efficiently deposit a pattern of granules on a continuous membrane or sheet of material. Such devices are disclosed in U.S. Pat. Nos. 4,295,445 and 4,352,837 issued to Kopenhaver. This type of apparatus and process for manufacturing roofing shingles is a long and complex process in which one stage includes applying a series of bands of coating asphalt with an inking wheel so that the granules will stick to the bands of asphalt in a pattern. Such a complex and time consuming process is expensive and unproductive. In the art of roofing shingle manufacturing, substantial efforts have been devoted to the simulation of wood or other such "natural" appearance and textures. For example U.S. Pat. Nos. 2,142,181 and 2,070, 571 exemplify a class of schemes for imitating the appearance of the grain of weathered wooden shingles.

Others have sought to create the image of depth by utilizing bands of different colored grit. For example, U.S. Pat. No. 1,368,947 utilizes stripping along adjacent edges of installed shingles to give an appearance of shading caused by thickness in shake or thatched roofs. U.S. Pat. No. 1,898,989 teaches the use of different colored sequential stripes for adjacent shingles. Also, the prior art includes another class of shingle construction wherein the lower edge of the shingles is irregularly cut or scalloped to give a random thatched appearance.

Bockh et al, proposes a system and method for depositing a pattern of media on a moving surface in U.S. Pat. No. 5,814,369 that includes a media depositing apparatus that deposits media in a predefined pattern on the moving surface. The media applicator roll having a media receiving region, such as engraved or raised portions, receives the media from a media feeder as the media applicator roll rotates. A media retaining member maintains the media in contact with the media receiving region until the media reach a bottom region of the media applicator roll and are released from the media applicator roll in the predefined pattern onto the moving surface. The method for depositing a pattern of media includes synchronizing the speed of rotation of the media applicator roll with the speed of the moving sheet of material so that the media are precisely deposited as they are released from the media receiving region.

Pastorutti et al, teaches a system and method for depositing a predefined pattern of a medium, such as granules or similar particles or viscous liquids on a moving surface in U.S. Patent Publication No. 2016033219A1. This apparatus and process disclosed concerns an apparatus and process to make decorations, patterns or designs on a material such as prefabricated water-proofing bitumen-mix membrane, usable, for example, for covering roofs or external surfaces of dwellings, such as terraces, apartment blocks or industrial plants.

The patents by Bockh and Pastorutti both teach a fixed predefined pattern roll applicator synchronized with the production line speed so that the predefined pattern is not blurred or distorted causing an unacceptable, unappealing look to the pattern and ultimately the finished material. There appears to be no teachings or disclosures in these and other similar patents on how to eliminate the zipper line or zig zag effect that is formed from a predefined repeating pattern or design, or disclose how to create a three dimensional pattern or design or more precisely a pattern or design that looks like a laminated designer shingle. Known prior art also does not disclose the sequence to create the pattern or design, the best sizes for the medium or granules or granule color blends needed to optimize the pattern or design or the colors, color blends or shading needed in order to make a pattern or design that is three dimensional and more precisely emulated the architectural laminate designer shingle until now.

SUMMARY

This apparatus and process disclosed relates to the application of a pattern on a material. In one embodiment the material is a construct on material, such as roof covering or siding where the exposed weathering surface is coated with colored media to create e dimensional pattern. The 3-D pattern is created in multiple detailed steps so that the width of the pattern can be of an adjustable size in order to make the pattern more diverse and variable.

The apparatus and method disclosed herein utilizes a series of applicator units which apply/deposit media onto a material. For roofing the applicator units would typically apply/deposit granules. The media can be sand, pumice or other colored or natural rock or mineral, paint, ink or the like. The applicator units can be designed to apply media in a pattern or without a specific pattern. For purposes of this disclosure a pattern applicator roll (or pattern roll) in each pattern applicator unit applies a pattern onto the material and a media applicator unit does not apply a pattern. The applicator units may include 1 or more pattern applicator units and can also include 1 or more media applicator units. The pattern applicator units apply a pattern or section of a pattern onto the material. In one embodiment the pattern applicator units include a pattern roll. In other embodiments the pattern applicator units could include a die or stamp roll with an engraved pattern. The pattern rolls apply/deposit the media onto the material via holes in the rolls created consistent with an intended design.

The first applicator unit is designed to be the master applicator unit. The master pattern roll (or master pattern applicator roll) in the master pattern applicator unit can be created with the entire design or one portion or section of the entire design pattern inscribed into the surface of the roll/cylinder.

Each applicator unit can include a separate drive or motor. This drive or motor can be adjusted manually or can be programmed to randomly speed up or slowdown the rotational speed of the associated applicator unit in comparison to the speed of the production line conveying the material such as the construction material. The fluctuation in rotational speed of the master pattern applicator unit changes the distance between the pattern sections applied by the applicator units. If the rotational speed of the master applicator unit is faster than the production line the pattern sections become closer together, if the rotational speed of the master applicator unit equals the line speed then the distance between sections remain constant and if the rotational speed of the applicator unit slows down the distance between the applied sections become further apart from each other. The addition of speed controllers for the applicator units allows the speed to be varied as desired to create a diverse pattern unlike existing apparatus and methods.

The apparatus and process disclosed incorporates one or more slave applicator units. Pattern applicator units include pattern applicator rolls or pattern rolls each of which has only one section or portion of the final design pattern inscribed into the surface of the cylinder located in sequential pattern applicator units. These slave pattern applicator units with slave pattern applicator rolls are synchronized to the master pattern applicator roll located in the master applicator unit. The number of slave applicator units with the slave pattern applicator rolls can vary depending on the intricacy of the pattern but it has been found that at least two and preferably three or more pattern applicator units containing the slave pattern applicator rolls make a well-defined 3-D pattern.

As the rotational speed of the master pattern applicator roll changes a programmed controller can alter the rotational speed of the slave pattern applicator rolls at the precise time so that the media is applied in the correct location based on when the master pattern roll applied the first section of the pattern. The algorithm that controls the slave pattern applicator rolls is based on parameters that take into account the rotational speed of the master pattern applicator roll, the diameter of the rolls and pattern sections and the current line speed so that subsequent pattern sections are placed in the correct location and the overall pattern is clear and precise.

The apparatus and process disclosed also incorporates the use of two media applicator units following the pattern applicator units that do not have pattern rolls located inside of them. Instead fluted rolls or cylinders or the like are used to apply the media onto the moving material. The application roll in the first of these media applicator units is programmed to randomly apply media to the moving material to give the final design a more diverse and variable look. This is unique compared to existing apparatus and methods where a design of equal dimensions and appearance has been presented. The final media applicator unit is used to fill in areas of the design pattern and at times where there is no pattern at all.

Another aspect of the apparatus and process disclosed defines the size or gradation of the media or granules used that best optimizes a predefined pattern or design. The apparatus and process disclosed also defines the use of specified media shades, tones, hues and colors to create a well-defined, esthetically pleasing three dimensional pattern as well as the use of contrasting light and dark media, granules or granule blends that enhances a three dimensional pattern or design and more precisely a pattern or design indented to emulate a laminated designer shingle.

For the construction material disclosed herein it can be made of asphalt, asphaltic compound, modified bitumen, elastomeric or thermoplastic polymers or combinations thereof that can be manufactured with a three dimensional (3-D) design or pattern that emulates the designer or laminated shingles homeowners tend to prefer. The construction material disclosed can cover about 50 or even about a 100 square foot area with a varied pattern and can offer the homeowner and contractor an easier and faster way of applying the material economically. This construction material when used as a roofing membrane as part of a system design may sustain less damage from a hail storm compared to some 3-tab and some laminated designer shingles.

The material can be manufactured using self-adhered compound, pressure sensitive adhesive, glue or the like on the back (or front) of the material with a silicone release liner or similar parting agent to prevent sticking during manufacturing, storage, transportation or installation of the material.

If the material is to be a 3-D simulated laminate shingle it can be created with a single tab adhesive, self-adhered compound, pressure sensitive adhesives and the like placed onto the top or bottom of the material in locations deemed appropriate to bond subsequent layers of material together or to the roof deck or lower layers of material.

The material can be created with a film located at the end of each roll to facilitate bonding of self-adhered modified bitumen compound, pressure sensitive adhesives, glue or the like that was applied to the back of the material during manufacturing.

The material can be manufactured with appropriate flame retardants added to the compound or compounds and or added to the substrate or substrates and or added to the surface of the compound prior to application of the media and or film and or added to a clear coating applied to the top surface of the material during or after installation.

The disclosed apparatus and process includes:
 the steps needed to create a 3-D pattern or design such as a 3-D laminated architectural shingle pattern or design
 the equipment modification needed to produce a pattern or design with a varied dimension that can reduce and even eliminate the zipper or zig zag effect
 the size of the media or granules and or granule blends needed to make and optimize the pattern or design
 the granules or granule blends to be added to the construction material to produce and optimize the design pattern
 the three dimensional laminated architectural shingle pattern consumers tend to want.

Figure 1:
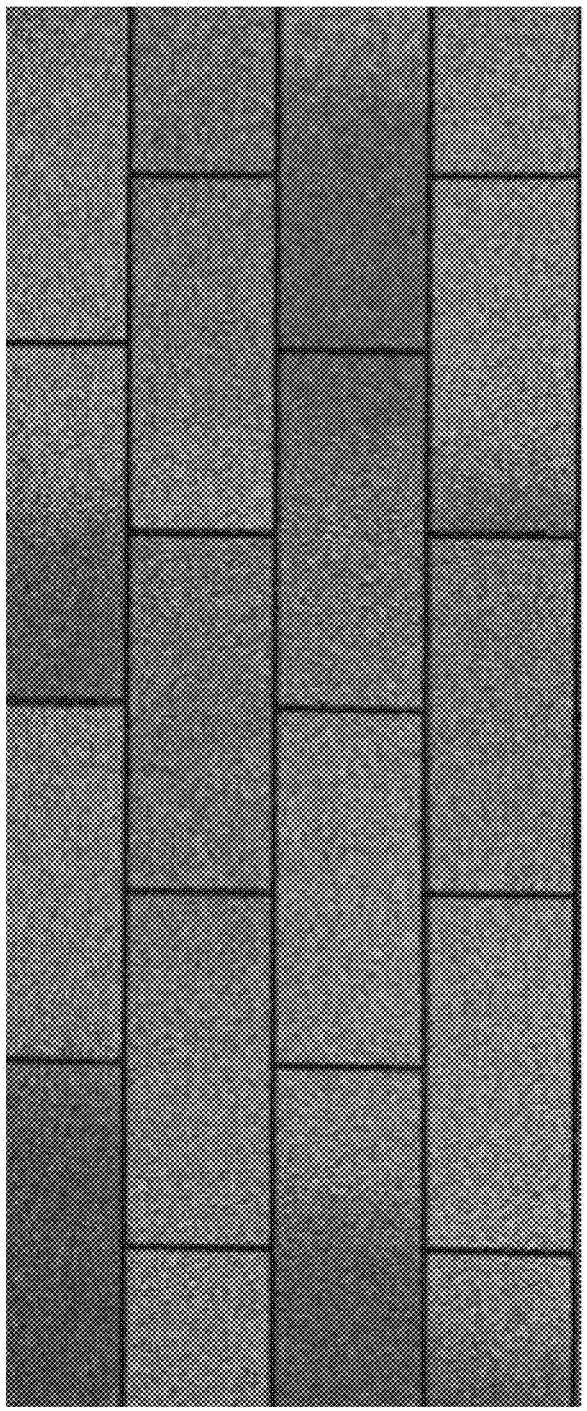
FIG. 1 shows a picture of a typical 3-tab shingled roof section.
Figure 2:
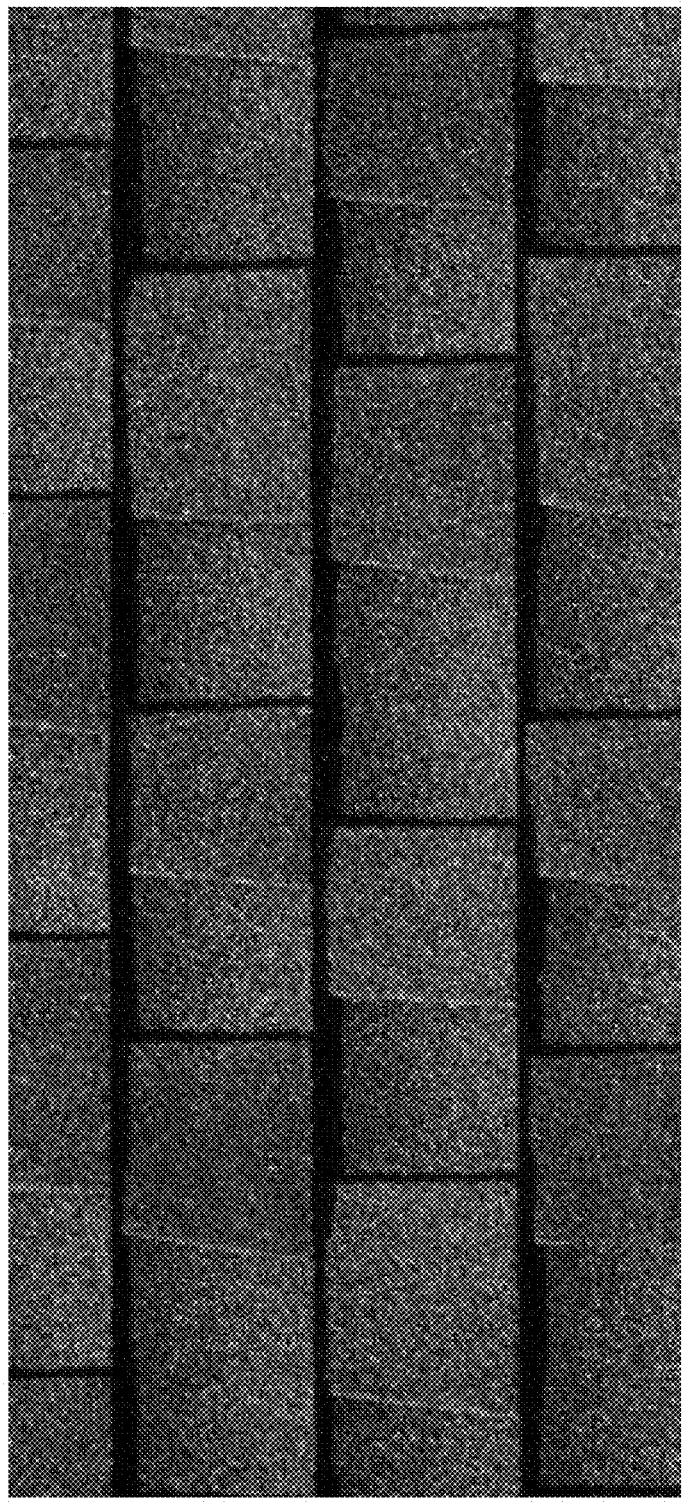
FIG. 2 shows a picture of a typical laminate architectural (dimensional) shingled roof section.
Figure 3:
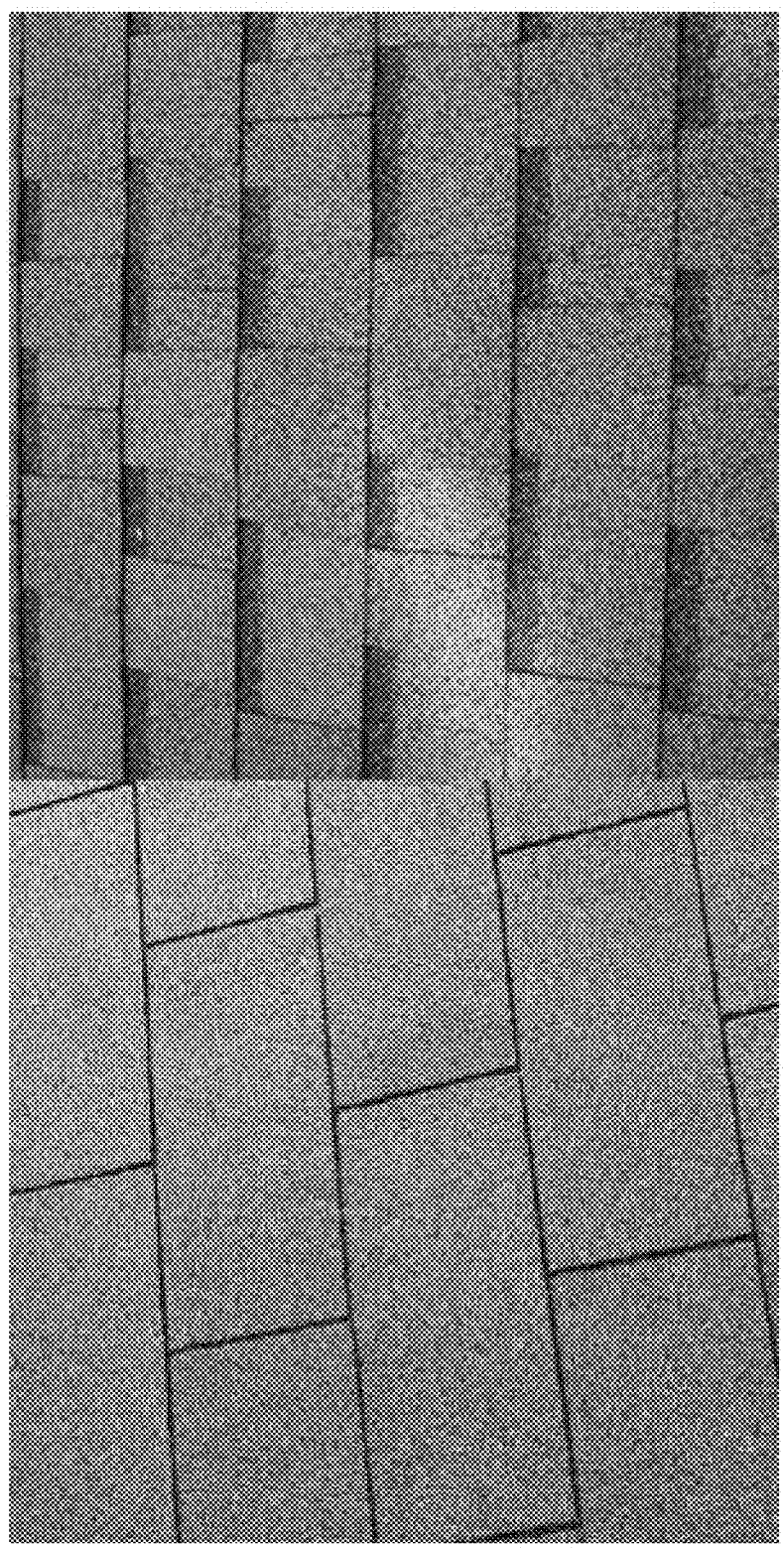
FIG. 3 shows a picture comparing a typical 3-tab shingled roof section and a typical laminate architectural (dimensional) shingled roof section side by side.
Figure 4:
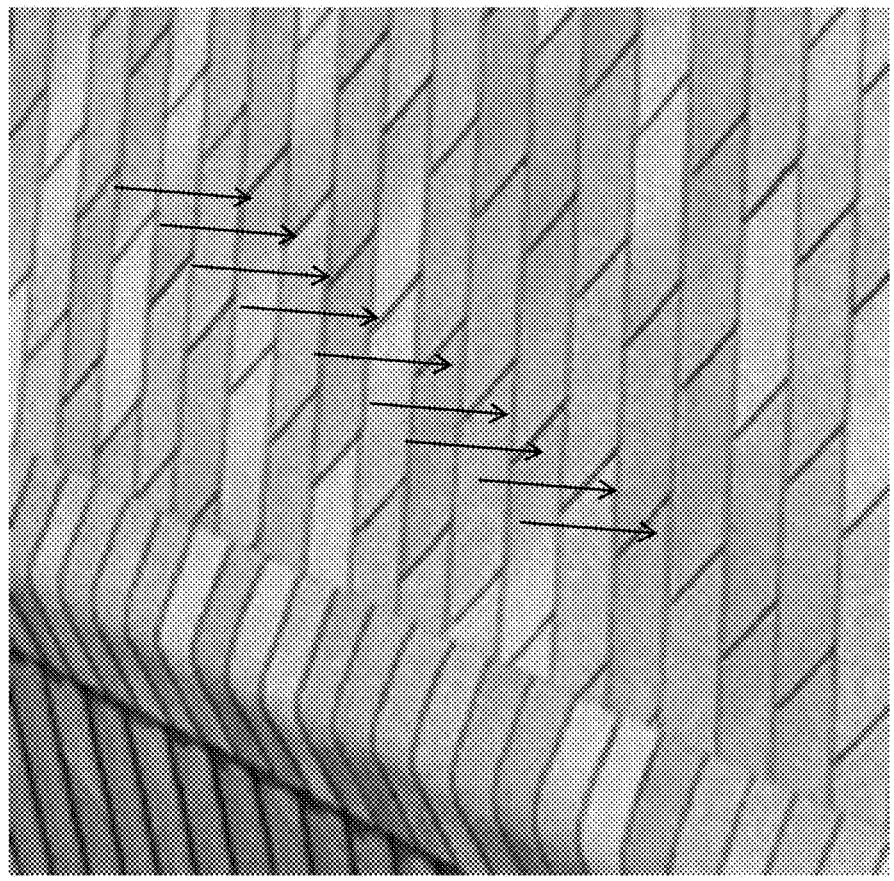
FIG. 4 shows a picture of a diagonal zipper or zig zag line often seen in standard 3-tab shingle roofs and on materials with a design that have fixed dimensions.

PART NUMBERS 10. construction material
12. first segment or edge
14. outline
16. upper shading area
18. lower shading area
20. master pattern applicator unit
22. pattern applicator unit
24. pattern applicator unit
26. pattern applicator unit
28. media applicator unit
30. media applicator unit
32. master pattern applicator roll
34. slave pattern applicator roll
36. slave pattern applicator roll
38. slave pattern applicator roll
40. adhesive
42. parting or release agent
44. film
50. pattern outline
52. pattern outline
54. optional release liner
56. timing hole
58. assembled view

DETAILED DESCRIPTION

Preselected media or granules are applied/deposited on a moving surface that may consist of asphaltic, modified asphaltic, modified bitumen, plastic and or elastomeric and or polymeric material or combinations thereof. The preselected media or granules are placed into hoppers or applicator units some of which have pattern applicator rolls located in the desired position somewhat near the bottom of these hoppers or pattern applicator units or applicator units in order to apply/deposit the desired media or granules onto the moving surface. The media or granules placed into these applicator units are specifically chosen for their size and or sieve gradation as well as their color, shade and or color blend based on the location of the applicator units, what portion or section of the overall pattern or design is being made by the pattern roll located inside of selected applicator units and based on the fill areas around the pattern or design in the applicator units that do not have a pattern roll inside as desired.

Figure 5:
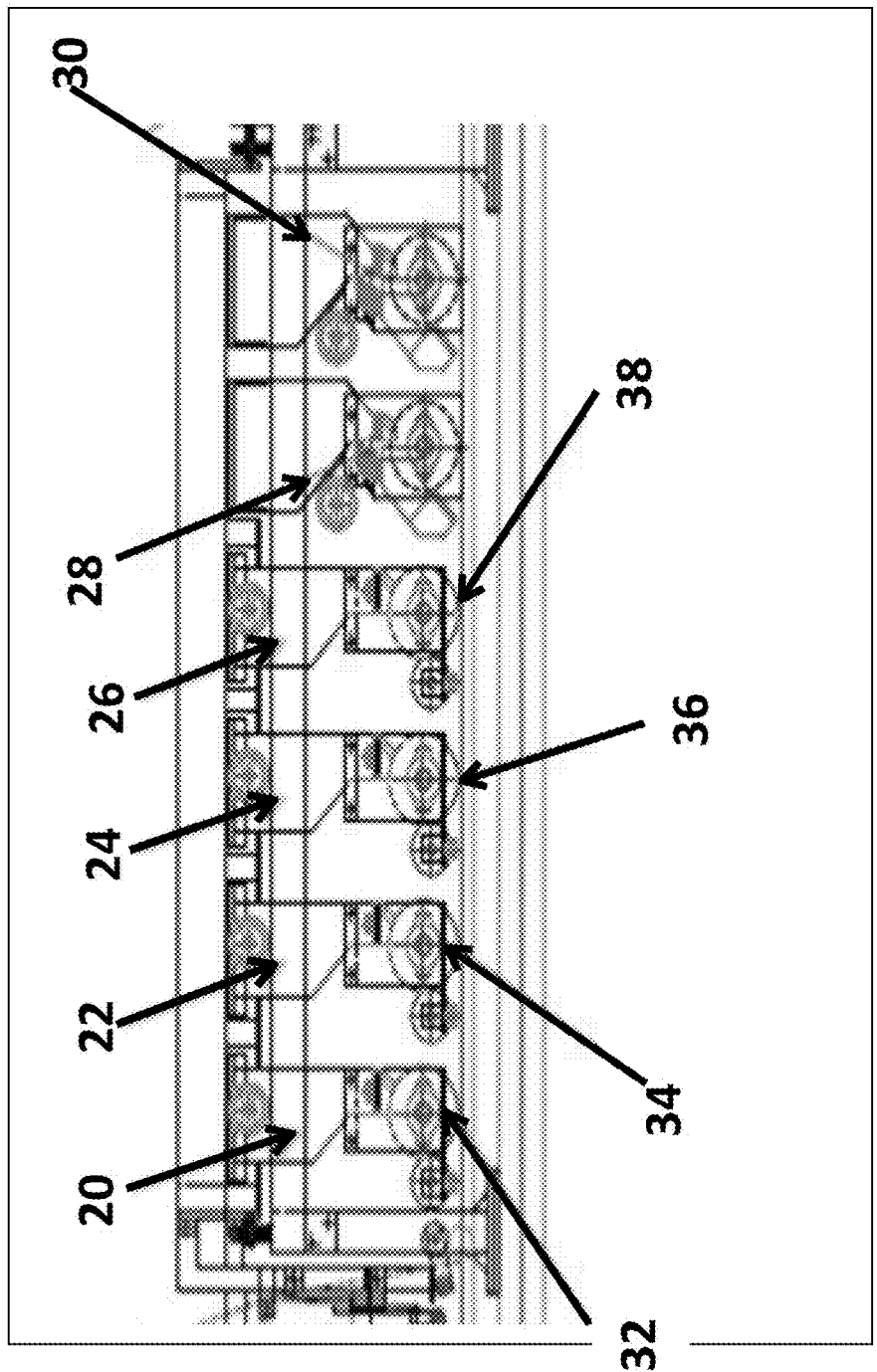
FIG. 5 depicts a series of six applicator units 20, 22, 24, 26, 28 and 30. The first four applicator units 20, 22, 24 and 26 are pattern applicator units each having special cylinders 32, 34, 36 and 38 called pattern applicator rolls or pattern rolls. These pattern applicator rolls or pattern rolls each have a section of the final pattern inscribed into the surface of the pattern applicator rolls. The first applicator unit 20 is designed to be the master applicator unit. The master pattern roll 32 (or master pattern applicator roll) is located in the master pattern applicator unit 20. The last two applicator units 28 and 30 are designated media applicator units.

The number of applicator units can be varied as desired for the intended configuration and design. In addition the applicators can be designed with pattern rolls to imprint a pattern, or to apply granules or other media like sand, talc, etc. that can also act as a parting or release agent to prevent the material from sticking together during manufacturing, storage or transport. The example configuration shown in FIG. 5 depicts a series of six applicator units 20, 22, 24, 26, 28 and 30. Applicator units 20, 22, 24, and 26 include pattern applicator rolls (pattern rolls) 32, 34, 36 and 38 which are located inside and near the bottom of its associated applicator unit and run in parallel with each other as desired.

Media or granule applicator units 28 and 30 depicted in FIG. 5 are used as desired to fill in the gaps in the pattern and where there is no pattern on the material. Media applicator units 28 and 30 can apply colored media or granules or other parting or release agents like sand, talc etc. that are applied after the three dimensional design is created. Media applicator units 28 and 30 can be programmed if desired to distribute media randomly onto the construction material to give the construction material a more diverse look.

Applicator units 20, 22, 24, 26, 28 and 30 can each be designed to distribute media across the full width or a partial width of the construction material as desired. When pattern applicator rolls 32, 34, 36 and 38 are in use, the design control allows a single pattern row with a defined pattern width or multiple pattern rows of that design pattern width can be produced as desired.

The pattern applicator rolls located inside the pattern applicator units rotate at a defined speed so that the preselected media or granules can be precisely applied or deposited onto the moving surface of the construction material. Any pattern desired can be created for an individual pattern applicator unit and as many patterns within associated pattern applicator unit as wanted can be created.

The first media or granule pattern applicator roll 32 is designed to be the master pattern applicator roll or unit. Pattern applicator rolls 34, 36 and 38 are designed to be slaves to media or granule pattern applicator roll 32. The three slave pattern applicators 34, 36 and 38 depicted on the example configuration in FIG. 5 are synchronized to the master pattern applicator roll 32.

The master pattern applicator roll 32 located inside the master pattern applicator unit 20 is designed so that its rotational speed is independent of line speed of the construction material as desired and can be manually adjusted, programmed or engineered to randomly speed up, maintain, or slow down the rotational speed of the master pattern applicator roll. The remaining slave pattern applicator rolls are synchronized to the master pattern applicator roll so that when the master pattern applicator roll rotation speeds up the slave pattern applicator rolls rotation speeds up accordingly. And when the master pattern applicator roll rotation slows down the slave pattern applicator rolls rotation slows down accordingly. The rotational speed of the master pattern applicator roll 32 can be varied at will in the master pattern applicator unit.

The variable rotational speed of master pattern applicator roll 32 permits the distance between corresponding edges in each desired pattern row to be lengthened or shortened as preferred by either increasing or decreasing the rotational speed of master pattern applicator roll 32 manually, through computer programming, and or engineering means. Synchronizing the slave pattern applicator rolls to the master pattern applicator roll ensures that the slave pattern applicator rolls apply the intended pattern in the same area applied by the master pattern applicator roll.

The variable rotational speed of the master pattern applicator roll permits the distance between the first segment, section, portion or edge of the pattern and corresponding segments, sections, portions or edges of that pattern in each desired pattern row to be lengthened or shortened as preferred by either increasing or decreasing the rotational speed of the master pattern applicator roll manually, through computer programming, and or by engineering means. Increasing or decreasing the distance between these sections, portions or edges as desired allows the preferred pattern or design to have a truly diverse look and appearance and enables the pattern rolls to generate a randomized pattern on the construction material that can eliminate the zipper line or zig zag effect found on fixed patterns of uniform size.

This variation in speed of the master pattern applicator roll and subsequent slave pattern applicator rolls causes the width of the design to vary and is a significant improvement to existing pattern rolls that apply/deposit media or granules and to the disclosures in existing patents where media or granules are applied/deposited onto a moving surface. Existing patents often disclose rotating pattern or design rolls where the speed of rotation of the pattern rolls that apply/deposit the media or granules must be synchronized to the production line speed or speed of the moving surface of the material in order to make a pattern or design that is not blurred or marred. Splitting the pattern into distinct sections or portions allows the use of variable speed pattern applicator rolls that are synchronized to each other that do not have to be synchronized to the production speed or speed of the moving material as desired.

The series of pattern applicator units containing pattern applicator rolls that create the design or pattern must be synchronized with each other and be designed in such a way where the variation of the rotational speed of the pattern applicator rolls do not cause the design or pattern to blur or mar when media is applied/deposited onto a moving continuous sheet or material.

The apparatus and process disclosed is accomplished by breaking the pattern design into several distinct sections as shown in the example depicted in the Figures so that each rotating pattern applicator unit containing a pattern applicator roll applies/deposits only part of the pattern on the continuous moving surface of the material. The examples presented on several of the disclosed Figures is of a 3-D design that emulates a laminated dimensional architectural shingle design that was broken down into distinct sections or portions to demonstrate this type of design for the apparatus and process disclosed. Clearly one knowledgeable in the art can break the final design down into more or less sections and in doing so would be consistent within this disclosure. The example design depicted in the Figures consists of four novel pattern applicator units containing pattern applicator rolls.

The number of pattern applicator units with pattern applicator rolls and the design of each can be created consistent with the overall design desired. Thus in the example disclosed the fourth pattern applicator unit could be optional depending on the desired shading or design desired. Also two media, sand or granule applicator units without pattern applicator rolls are disclosed in the example depicted on the Figures and if desired more or less media applicator units can be used depending on the design criteria. Also the width of construction material covered by any one applicator can be varied as desired.

Figure 6:
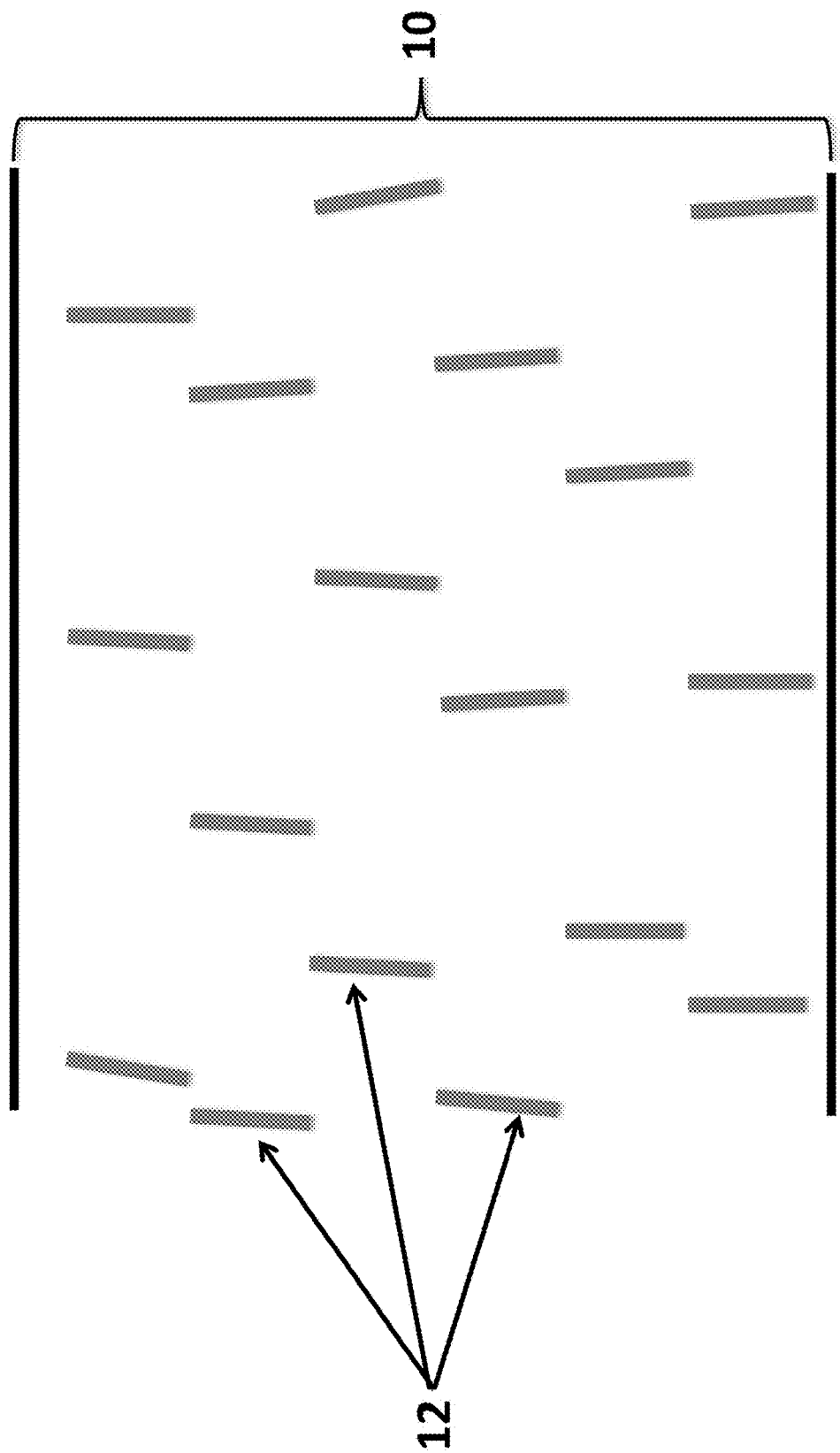
FIG. 6 illustrates an example of six rows of the first segment 12 of the pattern designated as first pattern applied to construction material 10 by master pattern applicator roll 32. Master pattern applicator roll 32 is equipped with a variable speed motor or drive that can change the rotational speed of the cylinder so that the width between each row of the first pattern can be lengthened or shortened as desired.

FIG. 6 illustrates an example of six rows of edge 12 being applied to construction material 10 by master pattern applicator roll 32 in pattern applicator unit 20 as illustrated in FIG. 1. In this example of a first pattern segment, edge 12 is applied to construction material 10 and can be considered either the leading or trailing edge of a 3-D simulated laminated architectural shingle design or can be the first edge or segment or section of any design pattern that is created to the desired width on construction material 10.

Figure 7:
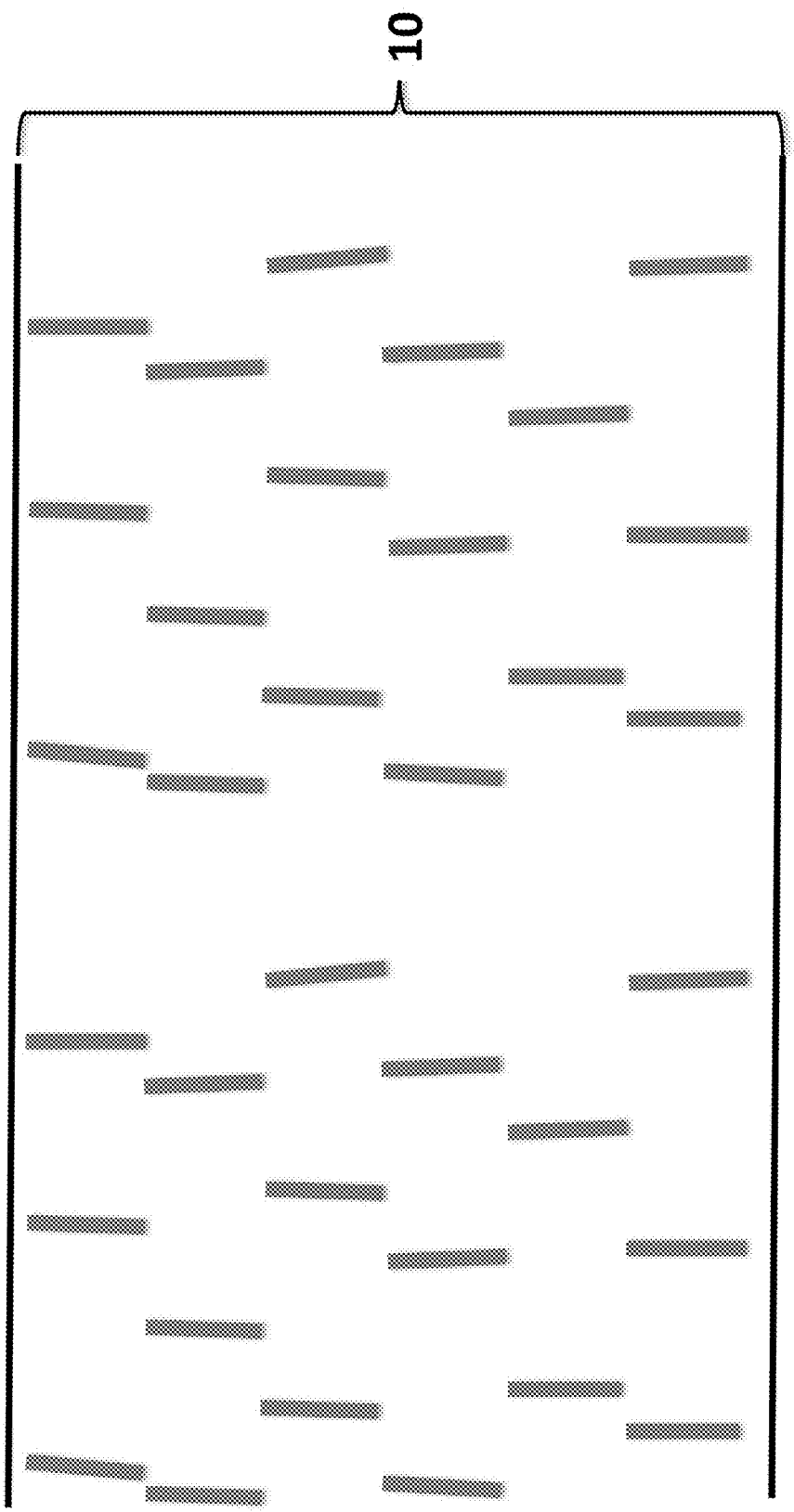
FIG. 7 illustrates the repeating segments of edge 12 generated by master pattern applicator roll 32 on construction material 10 based on the design and diameter of the pattern roll cylinder.

FIG. 7 illustrates the first pattern edge or segment or section created by master pattern applicator roll 32 across construction material 10.

Figure 8:
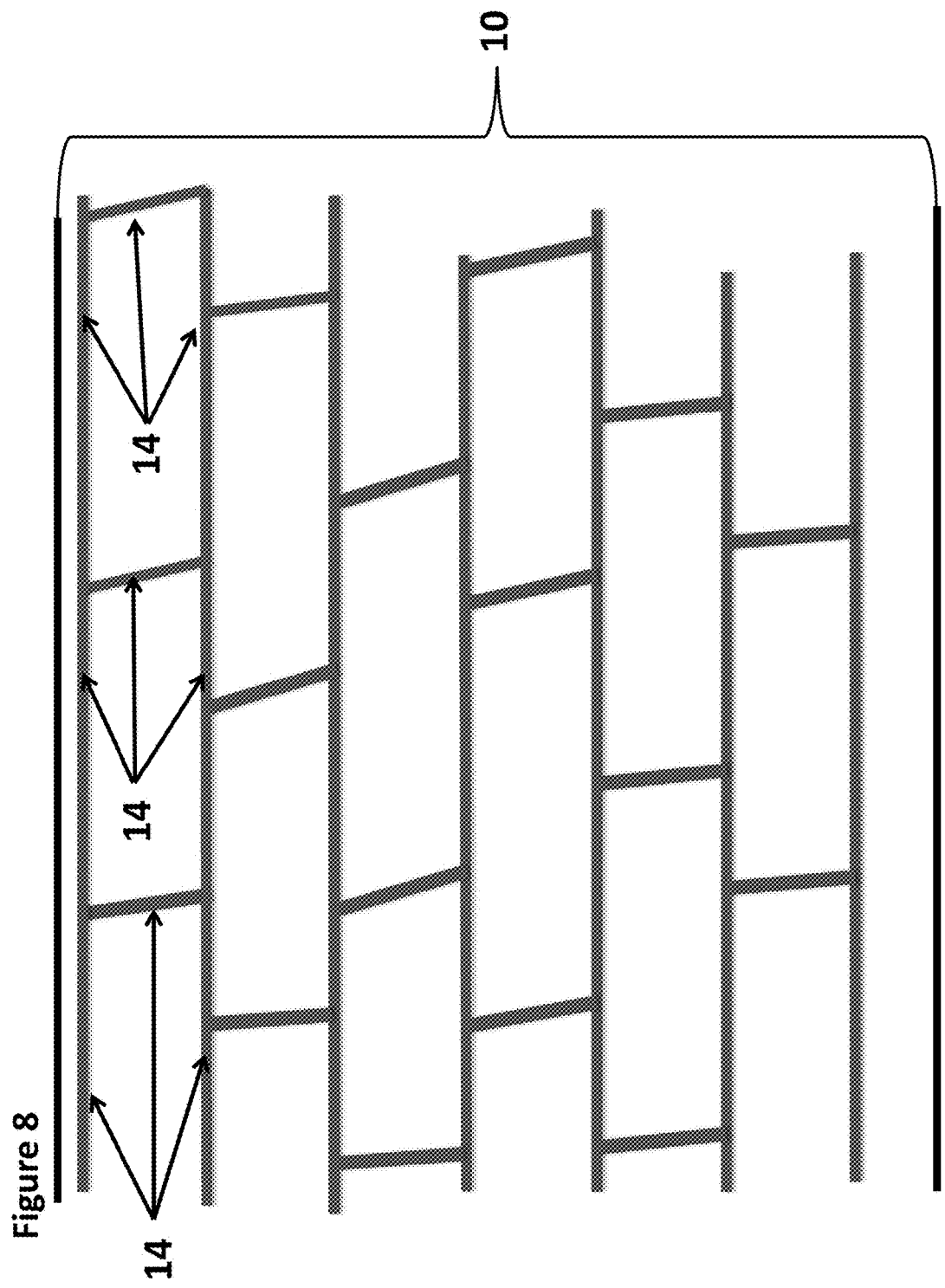
FIG. 8 displays six rows of outline 14 created on construction material 10 by slave pattern applicator roll 34. The slave pattern applicator rolls are synchronized to master pattern applicator roll 32.

FIG. 8 shows six rows of an example of a second pattern consisting of an outline 14 created on construction material 10 by slave pattern applicator roll 34 in pattern applicator unit 22 as illustrated in FIG. 5. The slave pattern applicator rolls are synchronized to the master pattern applicator roll so that the media from these pattern rolls are placed on the membrane in the correct location otherwise the design could be marred or blurred.

Figure 9:
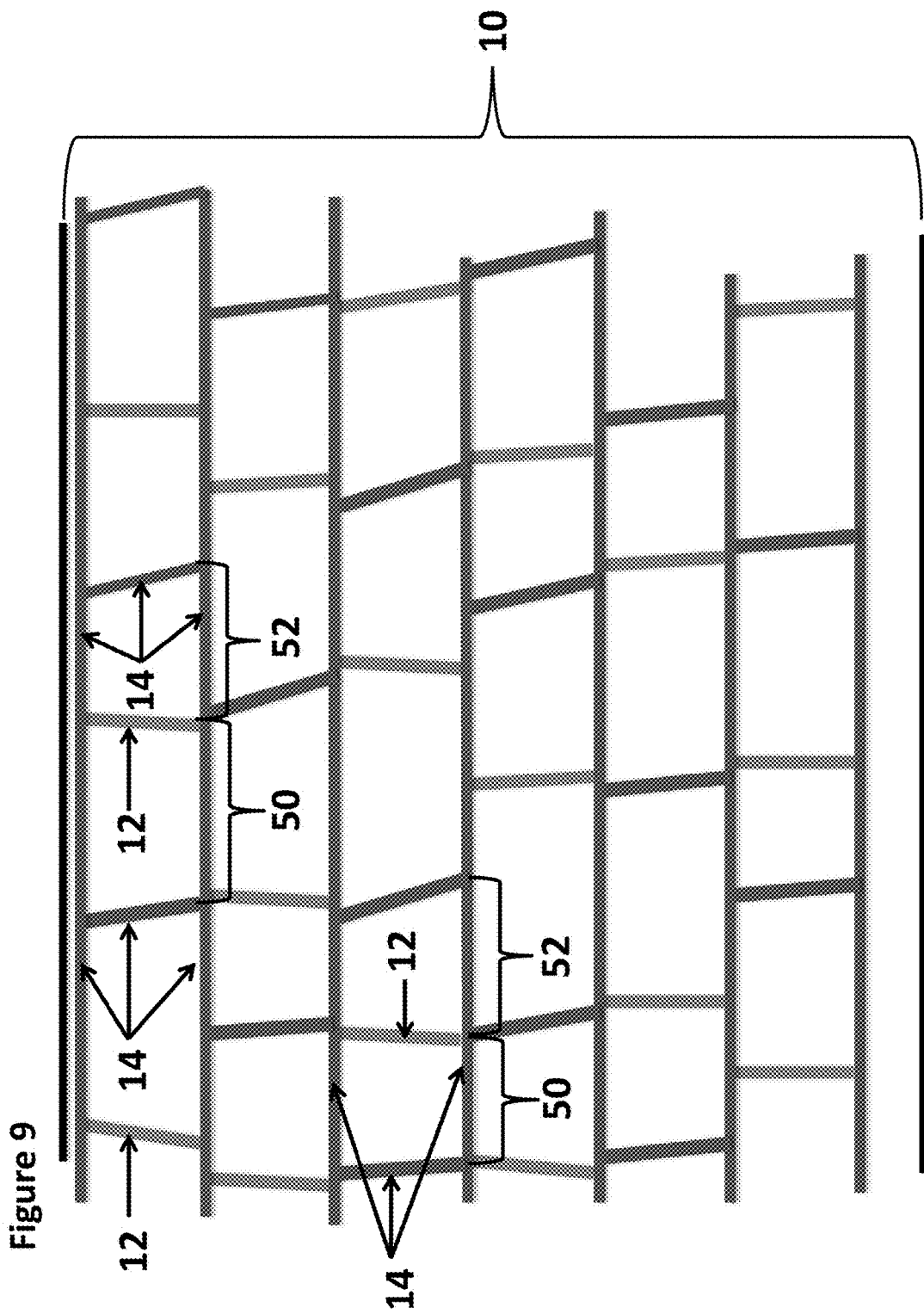
FIG. 9 shows six rows of pattern outline 50 and 52 created by master pattern applicator roll 32 that creates edge 12 and slave pattern applicator roll 34 that creates outline 14 on construction material 10.

FIG. 9 shows six rows of completed pattern outline 50 and 52 created by edge 12 and outline 14 from master pattern applicator roll 32 and slave pattern applicator roll 34 on construction material 10.

Figure 10:
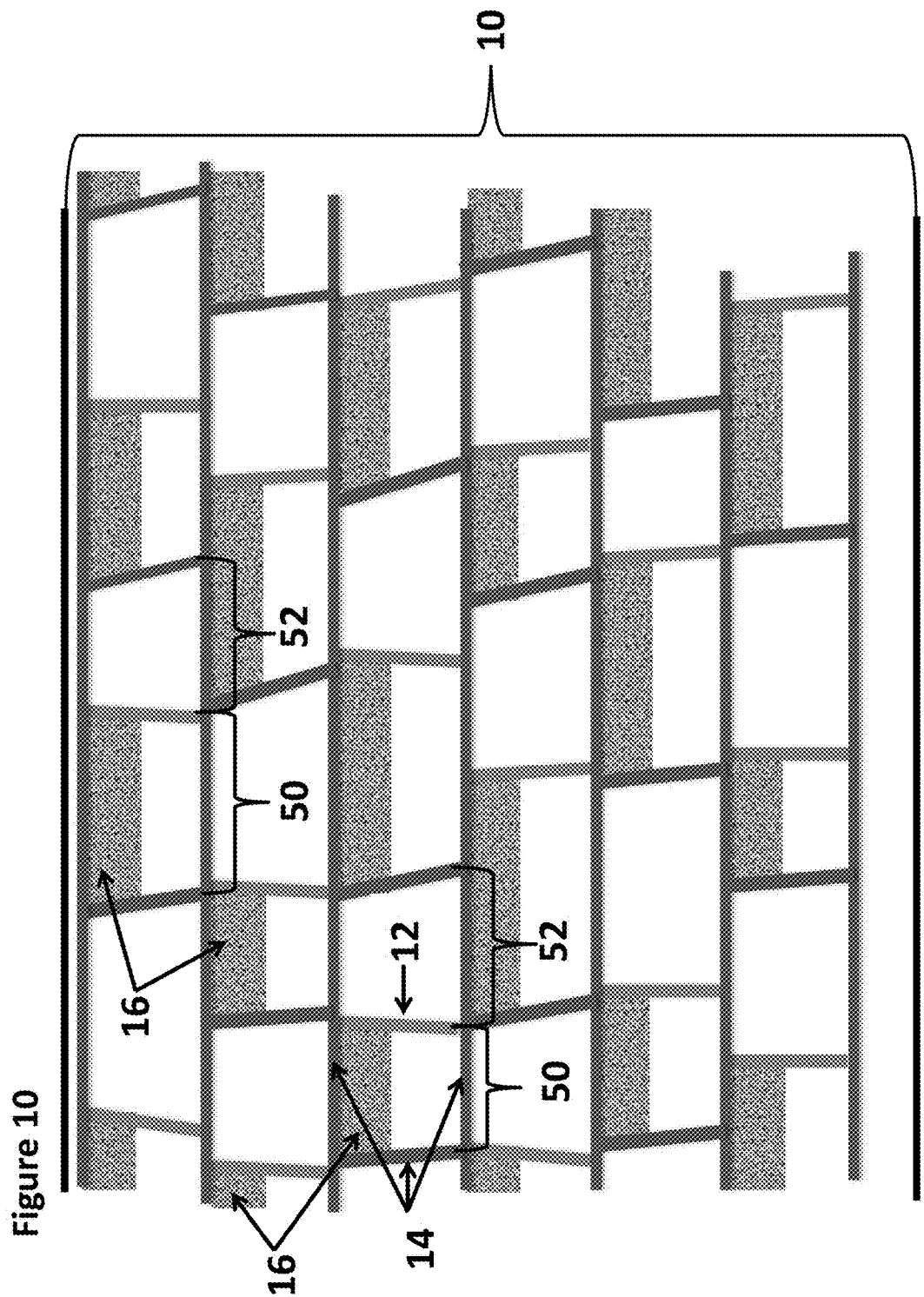
FIG. 10 depicts six rows of upper shading area 16 produced by slave pattern applicator roll 36 located inside completed pattern outline 50 on construction material 10. It should be noted that upper shading area 16 could be placed inside of pattern outline 52 if desired or in both outlines 50 and 52.

FIG. 10 depicts six rows of upper shading area 16 of an example third pattern produced by slave pattern applicator roll 36 that are located inside completed pattern outline 50 created by edge 12 and outline 14 on construction material 10.

Figure 11:
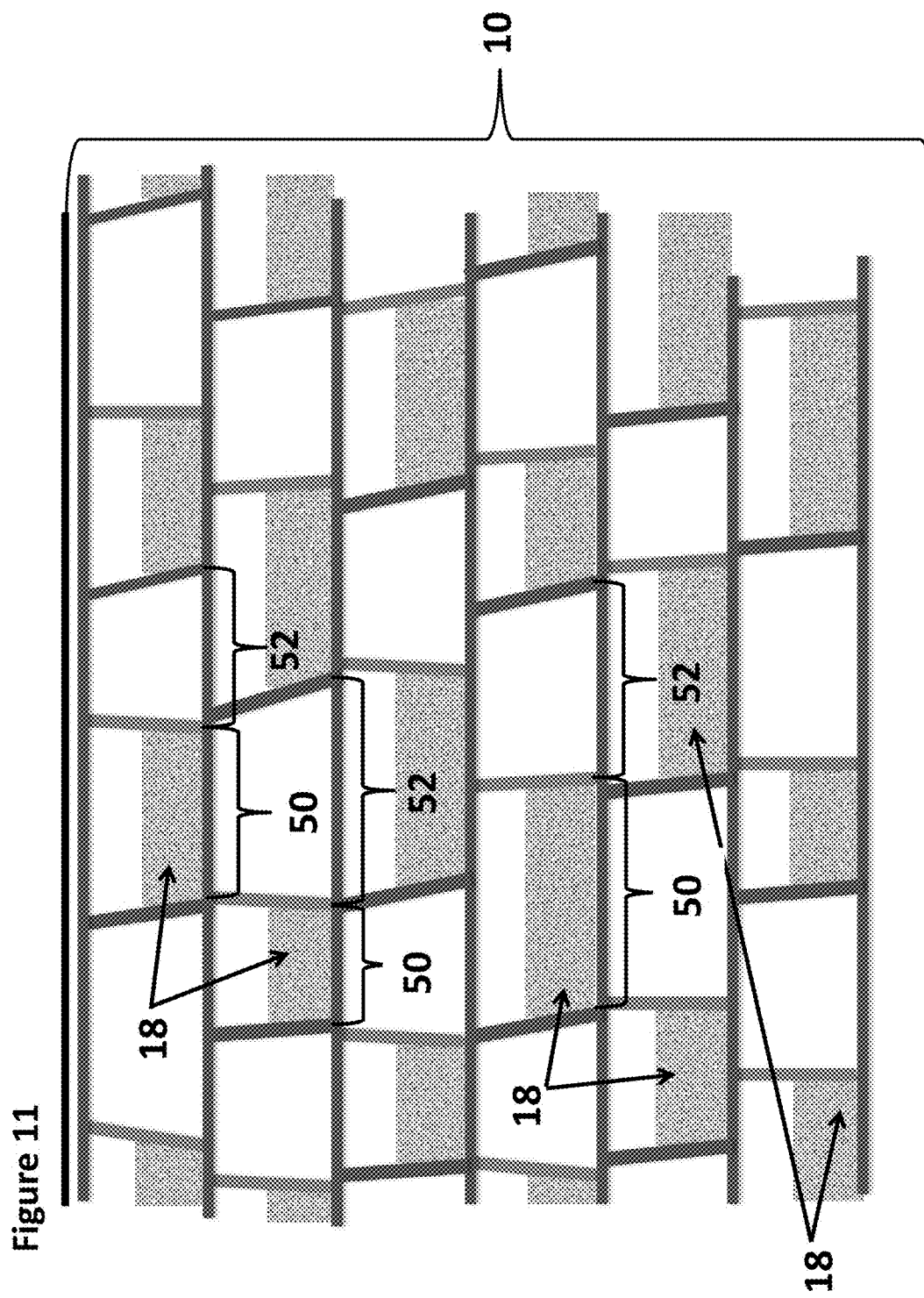
FIG. 11 portrays six rows of lower shading area 18 produced by slave pattern applicator roll 38 located below upper shading area 16 inside of outline 50 on construction material 10.

FIG. 11 portrays six rows of lower shading area 18 of an example fourth pattern produced by slave pattern applicator roll 38 located below upper shading area 16 inside of completed outline 50 on construction material 10.

Figure 12:
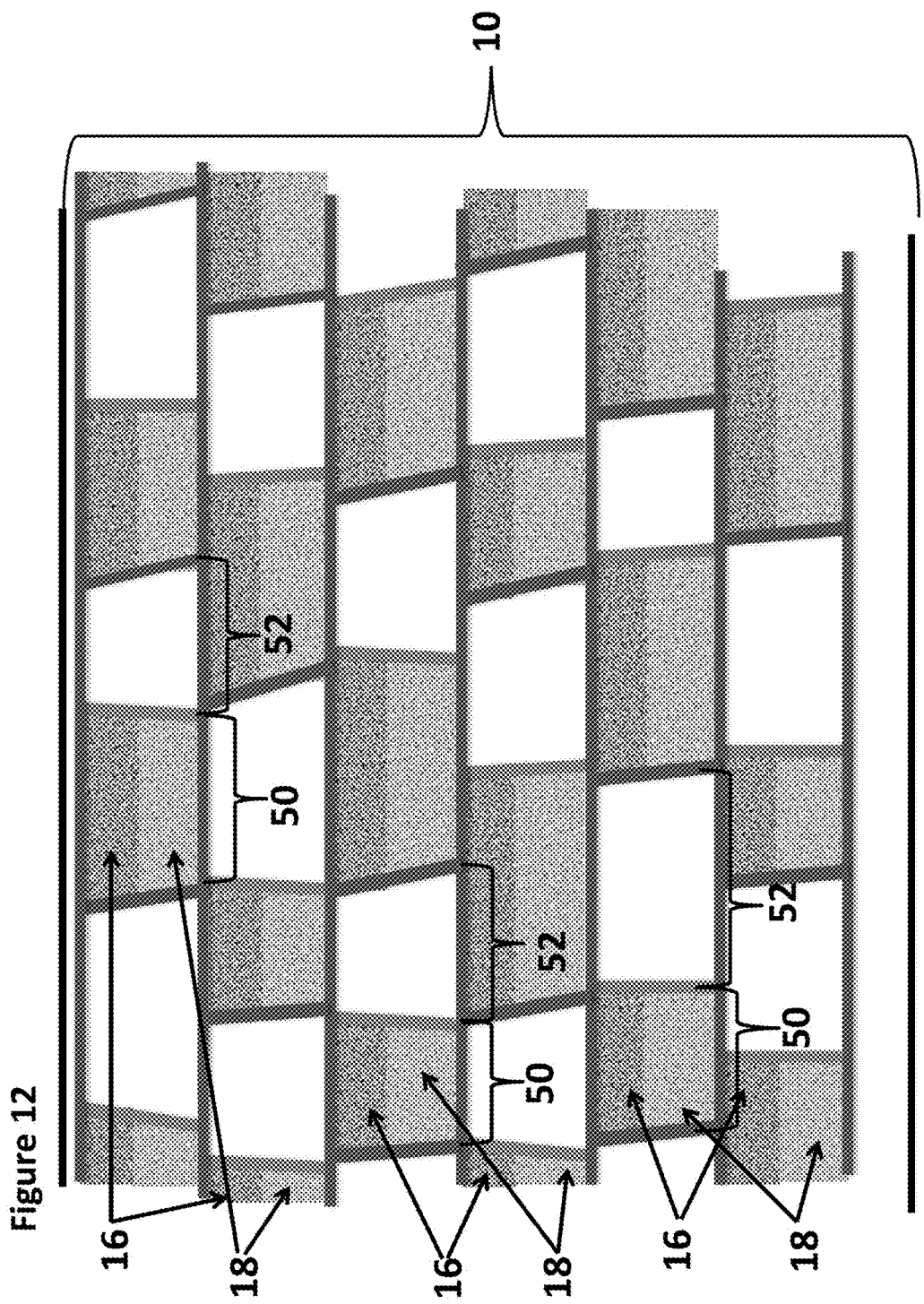
FIG. 12 shows six rows of the upper shading area 16 and six rows of the lower shading area 18 placed inside of completed outline 50 on construction material 10. It should be noted that these shading areas could be placed inside of pattern outline 52 if desired or in both outlines 50 and 52.

FIG. 12 shows six rows of the upper shading area 16 and six rows of the lower shading area 18 placed inside of completed outline 50 on construction material 10.

As with all patterns the design and location on which it is applied on the construction material can be created as desired. Thus for example the upper shading area 16 could be placed inside of completed pattern outline 52, and the upper shading area 16 and lower shading area 18 can both be designed to be applied inside of completed pattern outline 52 if desired.

Figure 13:
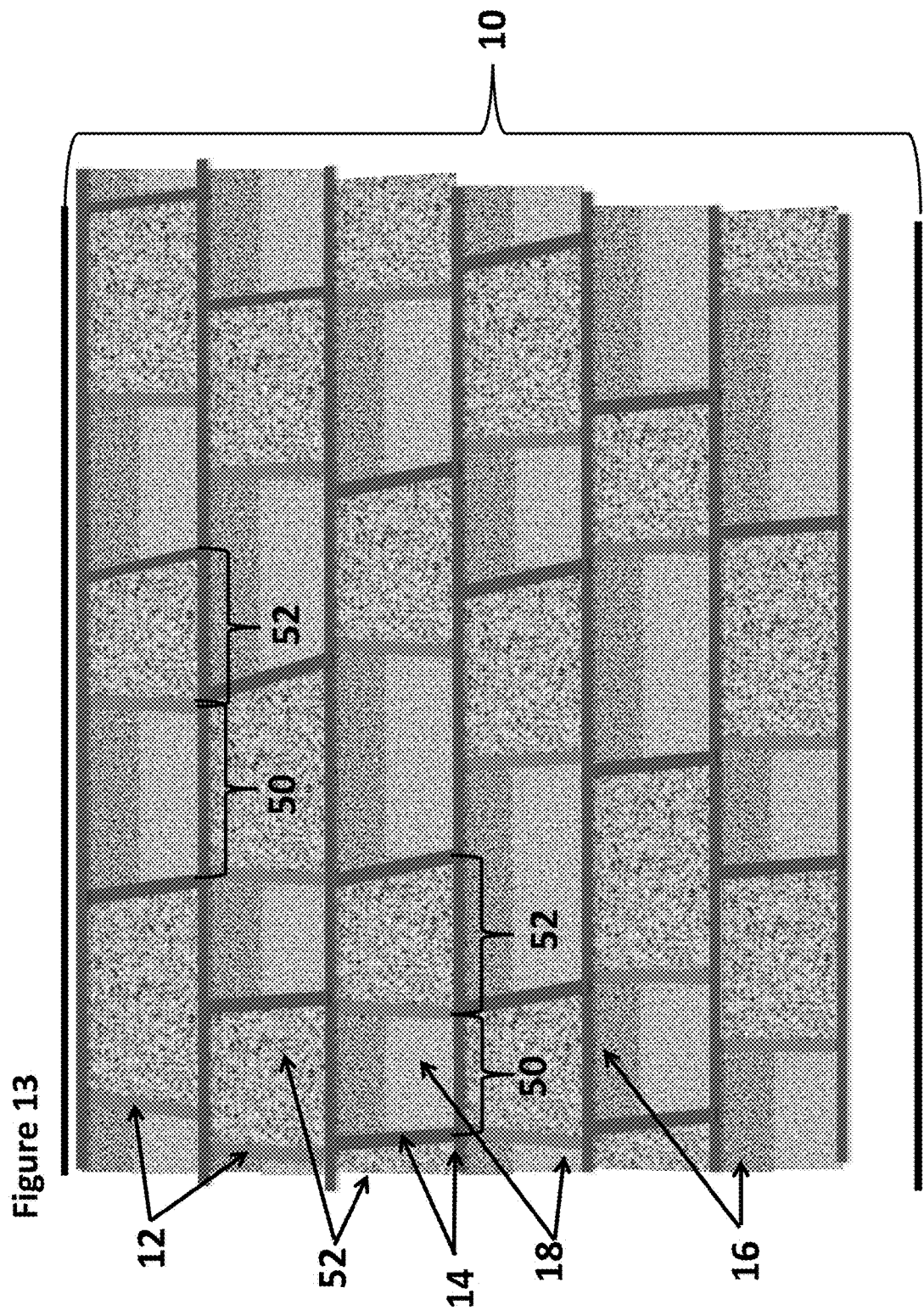
FIG. 13 illustrates a completed pattern consisting of six rows of outline 52 that are filled in using media dispensed from media applicator unit 28 and or media applicator unit 30 used alone or in tandem, as well as six rows of outline 50 made by the edge 12 and outline 14, upper shading areas 16 combined with lower shading areas 18 located inside of completed outlines 50 to generate a 3-D laminated architectural shingle design on construction material 10.

FIG. 13 depicts the result of the four patterns applied to the construction material by the example master and the three slave applicator units. It depicts six rows of outlines 50 and 52 made by edges 12 and outlines 14 wherein outline 50 is filled in with media to form upper and lower shading areas 16 and 18 and outline 52 is filled in using media or granules dispensed from media applicator unit 28 and or media applicator unit 30. Media applicator units 28 and 30 can be used alone or in tandem to generate and simulate a completed 3-D laminated architectural shingle design presented in this patent on construction material 10.

Figure 14:
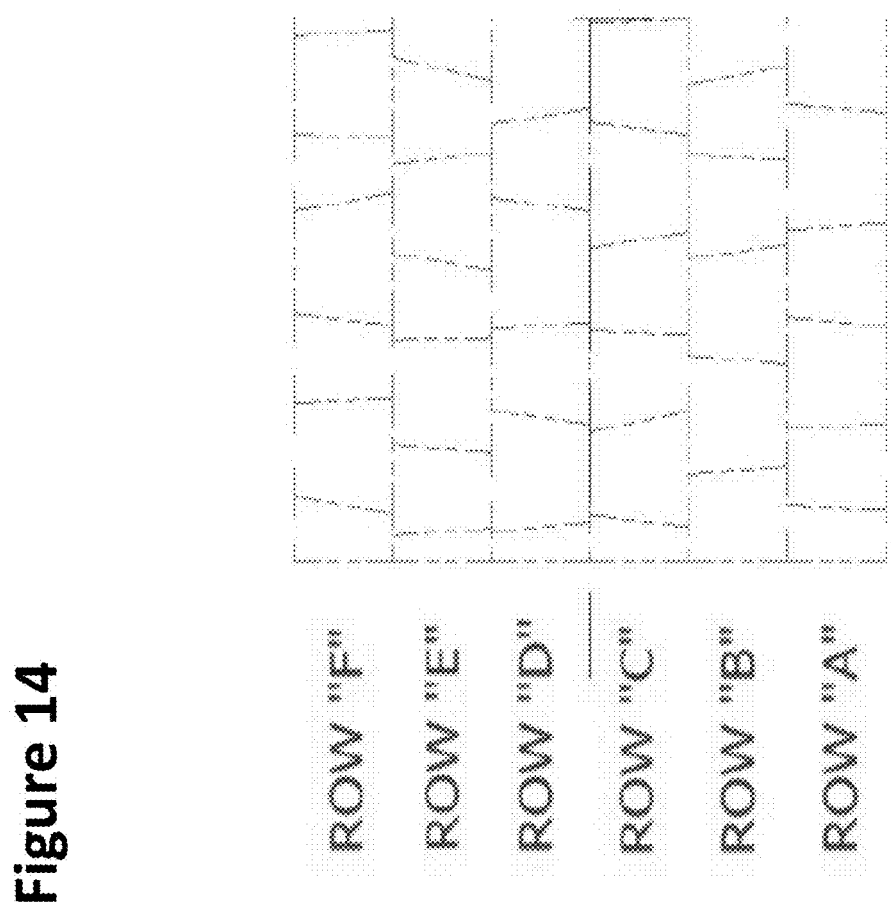
FIG. 14 represents a 3-D laminated architectural shingle design pattern so that the pattern repeats in each row every 690 mm and each row has a height of 152 mm. It is noted that this is one of any number of pattern designs that can be used for the apparatus and process disclosed.

FIG. 14 depicts the preferred design pattern for a 3-D laminated architectural shingle design with the preferred row offsets intended to produce a construction material with up to six rows of the 3-D laminated architectural shingle design that enables a half width or full width pattern on the construction material.

Figure 15:
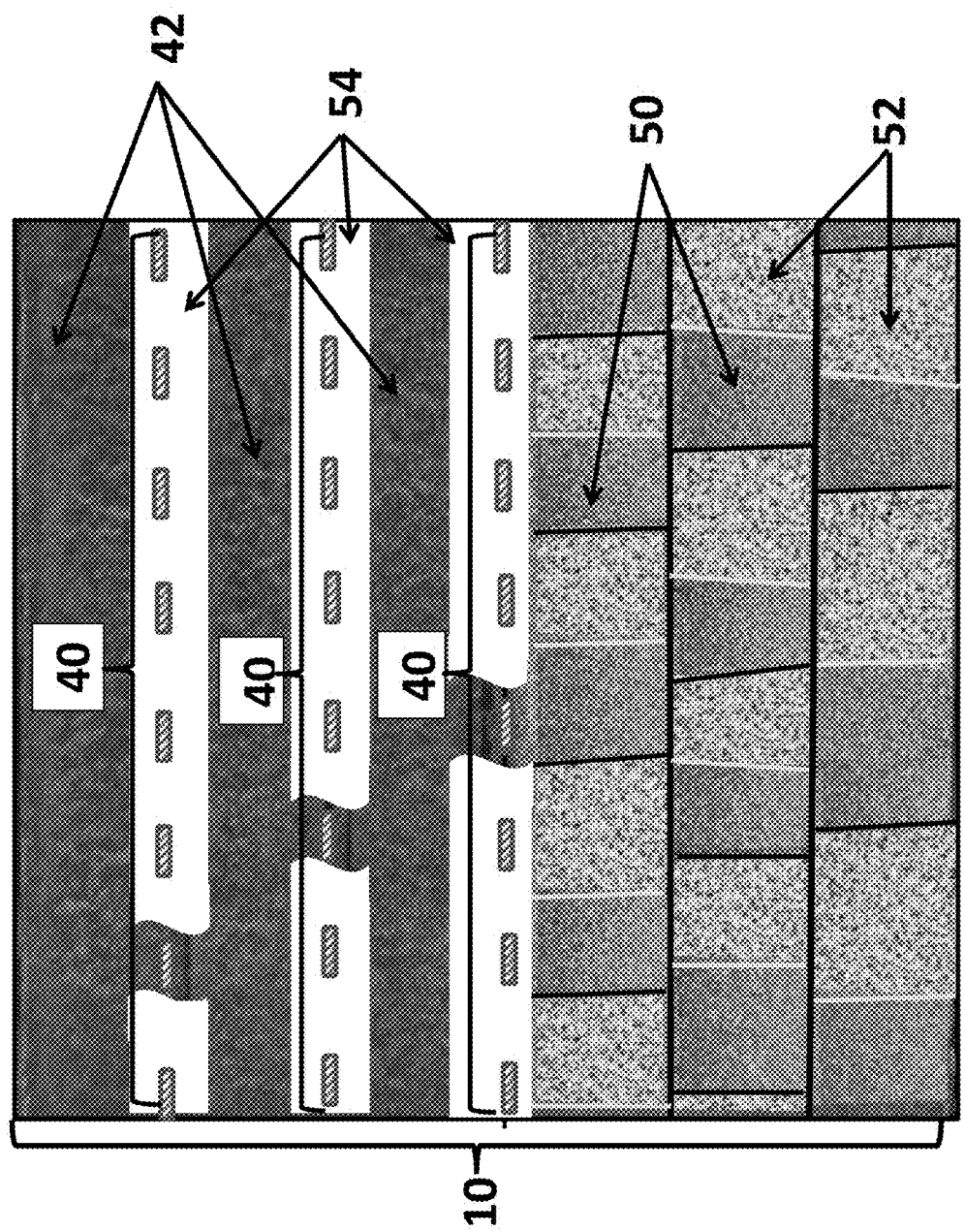
FIG. 15 depicts construction material 10 that has three rows of a design or pattern outline 50 and 52 that are exposed to the elements after application. Construction material 10 is intended to be mechanically fastened above the design rows. Parting or release agent 42 covers the non-design area, three rows of adhesive 40 is placed on top of parting or release agent 42 for bonding the next layer of construction material 10. Three strips of optional release liner 54 are shown on top of adhesive 40 and are removed during application.

FIG. 15 depicts construction material 10 that can be applied by manually fastening using nails, staples, screws, etc. consisting of three rows of completed pattern 50 and 52 with parting or release agent 42 covering the remaining area not covered with the pattern. There are three rows of adhesive 40 and three strips of optional release liner 54 on top of adhesive 40 to prevent the adhesive from sticking or bonding during manufacturing, storage and or prior to application as needed.

The completed pattern 50 and 52 shown on the Figures for the example design is designed to be preferably less than half the total width of the membrane so that when the construction material is installed parallel to the roof edge there are areas on the roof where the construction material will overlap three times and have triple coverage for better weathering, hail, fire and wind performance.

Construction material 10 is designed so that there is a layer or partial layer(s) or areas of adhesive on the back of the construction material that will self-adhere the intended surface as desired for applications such as roofing, siding or flooring areas, roofing or siding substrates or underlayments, and or to film 44 when overlapping subsequent rows of material. Release liners are typically used on the back of the self-adhered construction material 10 to prevent the material from bonding or sticking during manufacturing, storage and transporting the material prior to application.

To increase wind up lift performance or to secure the membrane during installation, the construction material can be mechanically fastened in the overlap area where film 44 is located. Film 44 can have lines or areas designated as to where these mechanical fasteners should be applied or the mechanical fasteners can be applied in a pattern designated by the manufacturer or placed randomly as needed or instructed.

Figure 16:
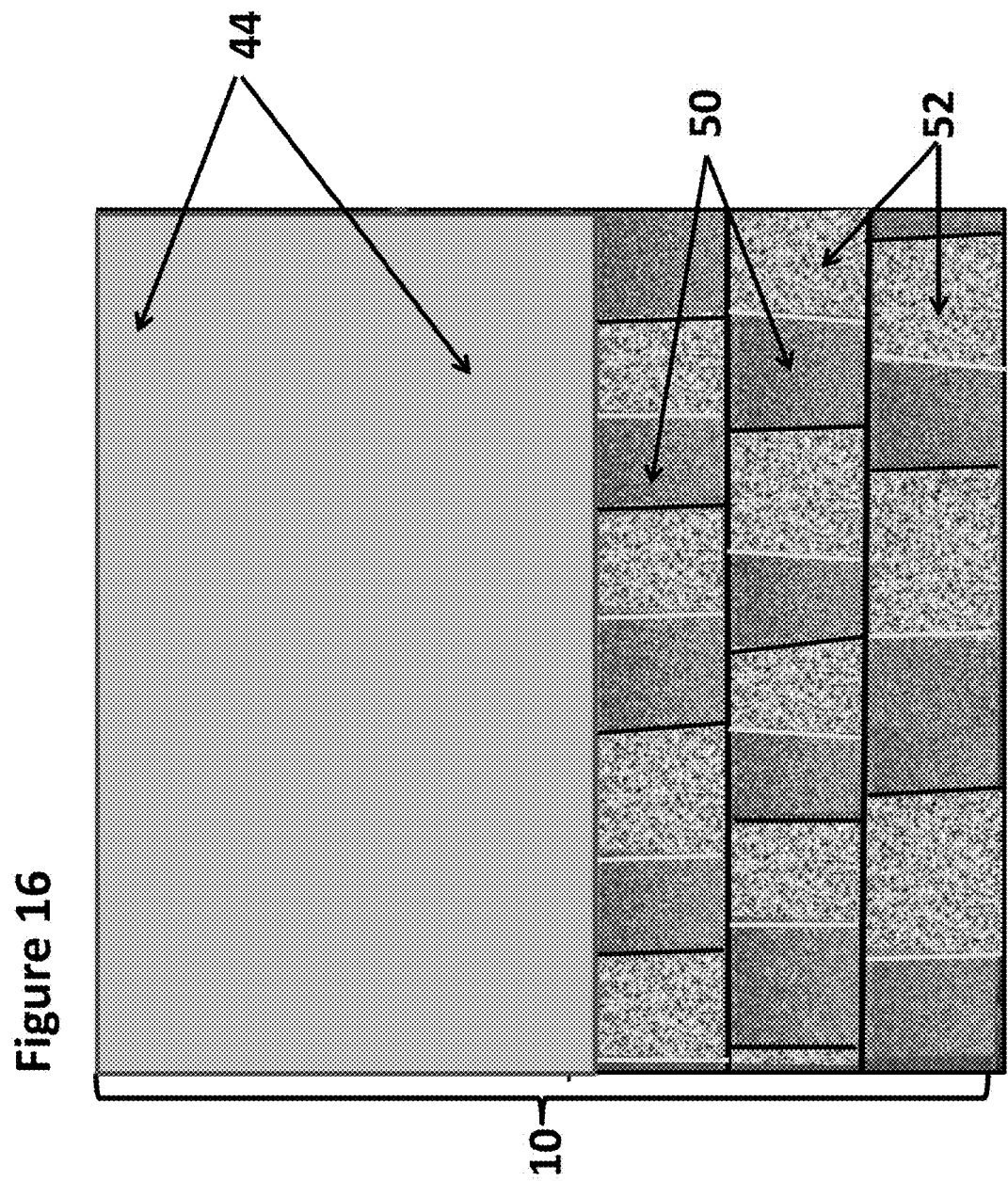
FIG. 16 represents construction material 10 that has three rows of a design 50 and 52 that are exposed to the elements after application. Construction material 10 is intended for self-adhered applications with film 44 acting as a bonding area to bond the next layer of self-adhered construction material 10. Film 44 also acts as a parting or release agent.

FIG. 16 demonstrates a self-adhered construction material 10 consisting of three rows of completed pattern 50 and 52 with film 44. Film 44 can act as a bonding area and or parting or release agent that covers the remaining area on construction material 10 that is not covered with completed pattern 50 and 52.

Figure 17:
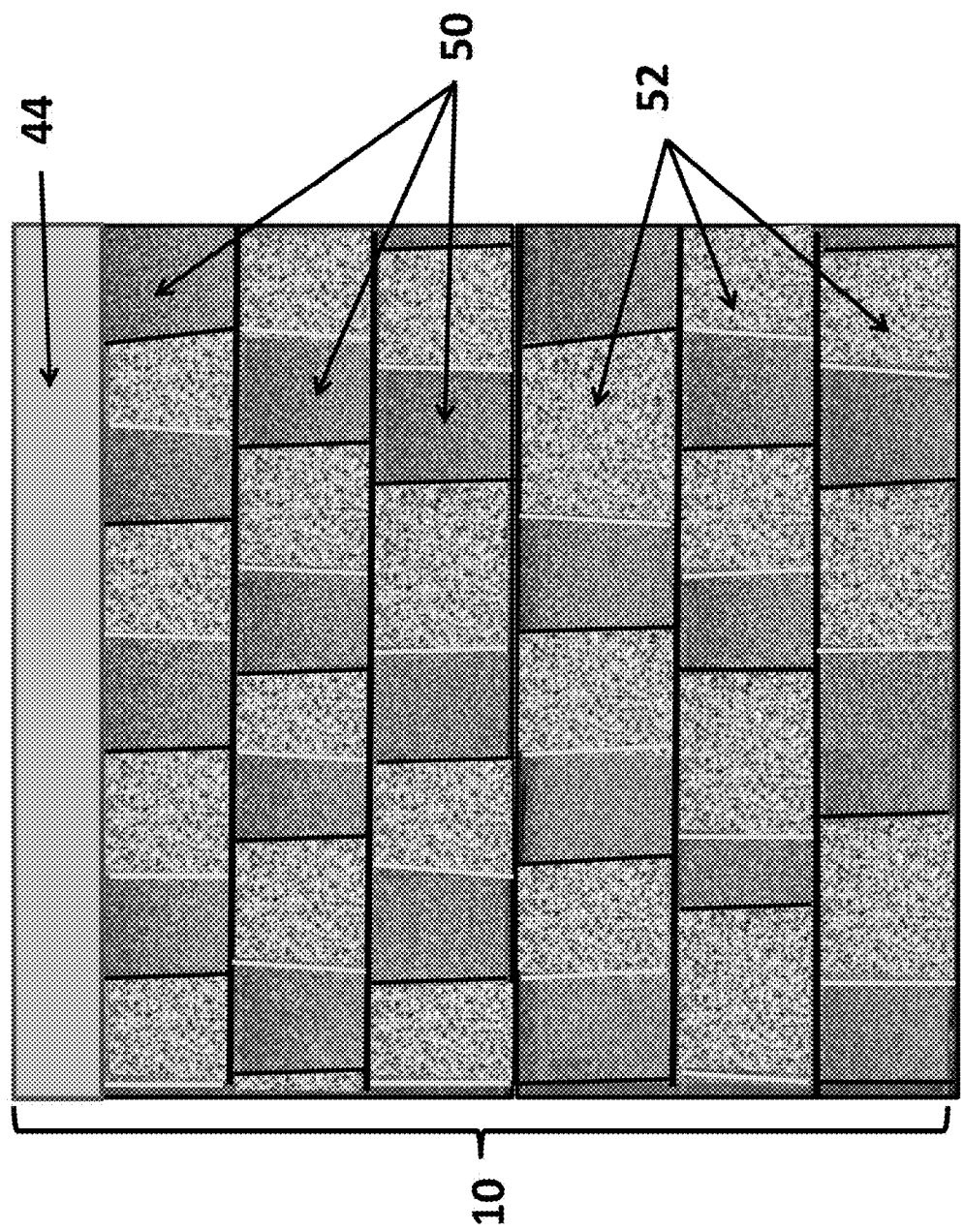
FIG. 17 represents construction material 10 that has six rows of a design 50 and 52 that are exposed to the elements after application. Construction material 10 is for self-adhered applications with film 44 acting as a bonding area for bonding the next layer of self-adhered construction material 10. Film 44 also acts as a parting or release agent.

FIG. 17 demonstrates a self-adhered construction material 10 consisting of six rows of completed pattern 50 and 52 with film 44. Film 44 can act as a bonding area and or parting or release agent that covers the remaining area or construction material 10 that is not covered with completed pattern 50 and 52.

Figure 18:
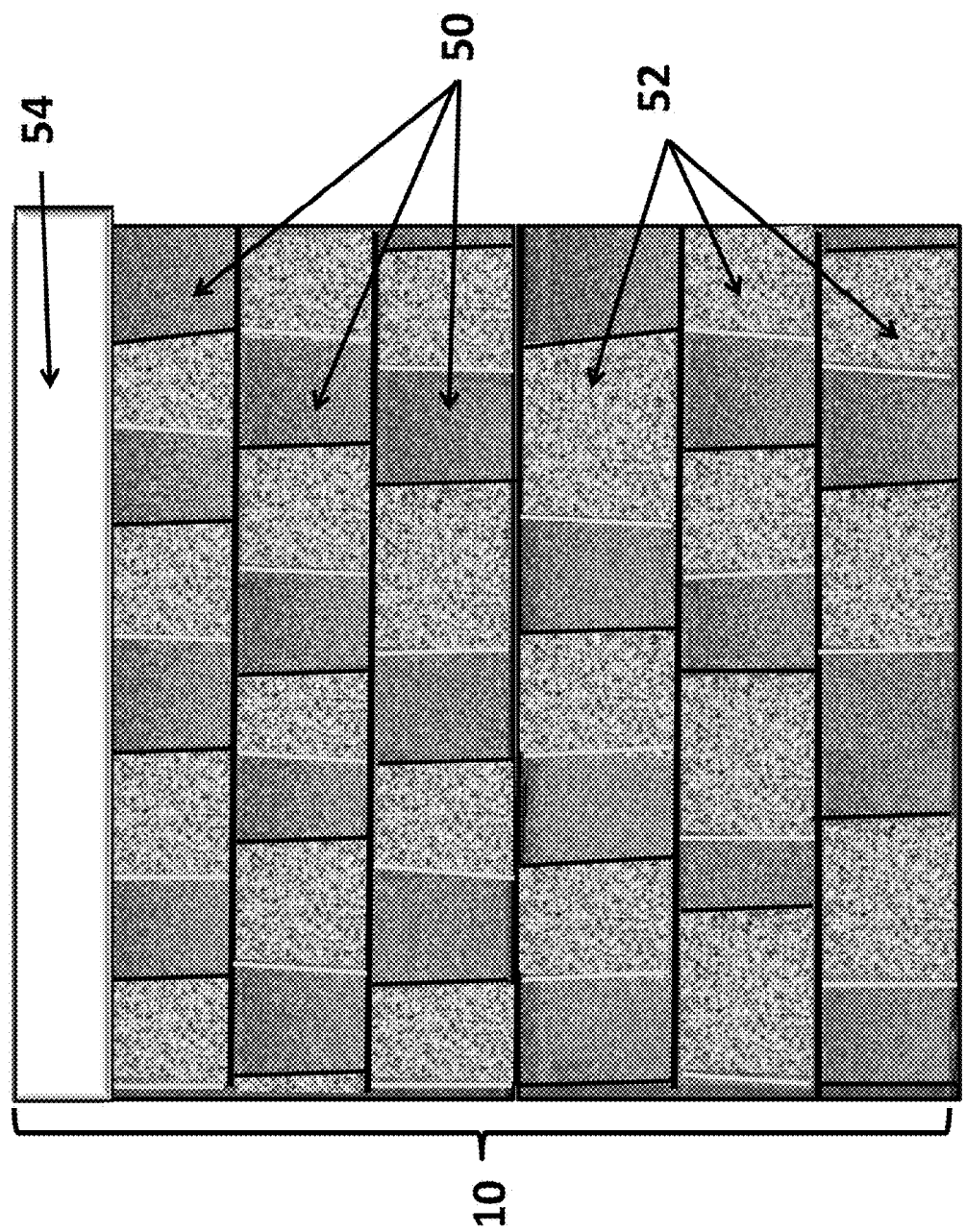
FIG. 18 demonstrates construction material 10 that has six rows of a design 50 and 52 that are exposed to the elements after application. Construction material 10 is for self-adhered applications with release liner 54 covering a layer of self-adhered compound and or compound that permits good bonding to another layer of self-adhered membrane when overlapped in that area. Release liner 54 also acts as a parting or release agent and is removed during application.

FIG. 18 demonstrates a self-adhered construction material 10 consisting of six rows of completed pattern 50 and 52 with release liner 54 that acts as a parting or release agent covering the remaining area not covered with pattern 50 and 52. The area under release liner 54 can be a layer of adhesive and or material and or compound that permits good bonding to a self-adhered membrane when overlapped in the area under release liner 54.

To increase wind up lift performance or to secure the membrane during installation, the construction material can be mechanically fastened in the overlap area after removing release liner 54. The completed pattern 50 and 52 is designed to be preferably less than half the total width of the membrane so that when the construction material is installed parallel to the roof edge there are areas on the roof where the construction material will overlap three times and have triple coverage for better weathering, hail, fire and wind performance.

Figure 19:
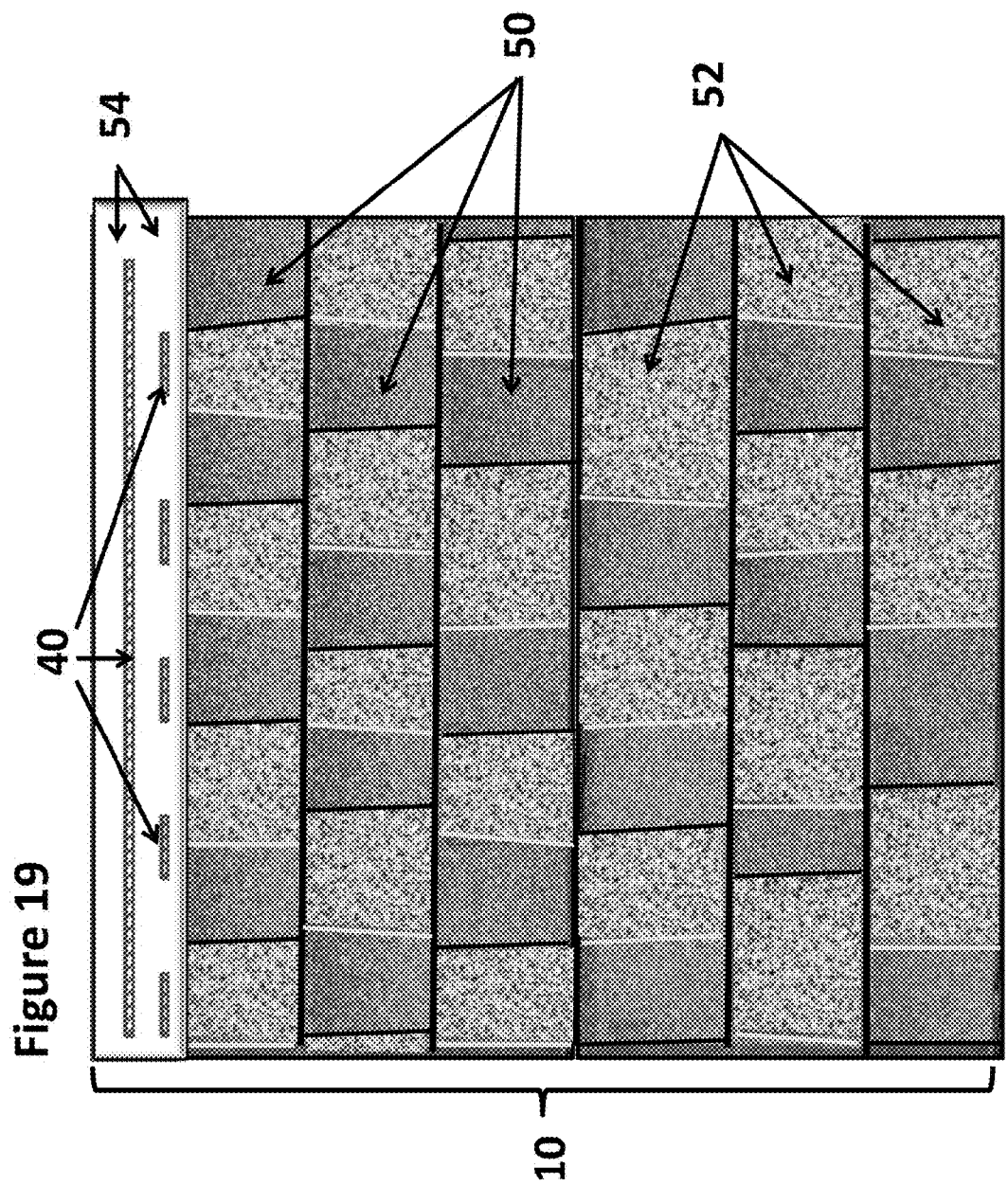
FIG. 19 illustrates construction material 10 that has six rows of a design 50 and 52 that are exposed to the elements after application. Construction material 10 is for self-adhered applications with release liner 54 covering an additional layer or layers of adhesive 40 for rapid bonding on top of a layer of self-adhered compound and or compound that permits good bonding to another layer of self-adhered membrane when overlapped in that area. Release liner 54 also acts as a parting or release agent and is removed during application.

FIG. 19 illustrates a self-adhered construction material 10 consisting of six rows of completed pattern 50 and 52 with an additional layer of adhesive 40 that is added on or near the overlap area to improve and provide instantaneous bonding along the overlap edge area as desired covered with release liner 54 that acts as a parting or release agent covering the remaining area not covered with pattern 50 and 52. The area under release liner 54 and adhesive 40 can be a layer of a different adhesive and or material and or compound that permits bonding to a self-adhered membrane when overlapped in that. Adhesive 40 is protected by optional release liner 54 or some other means that prevents sticking and bonding during manufacturing, storage and transporting the material prior to use.

Figure 20:
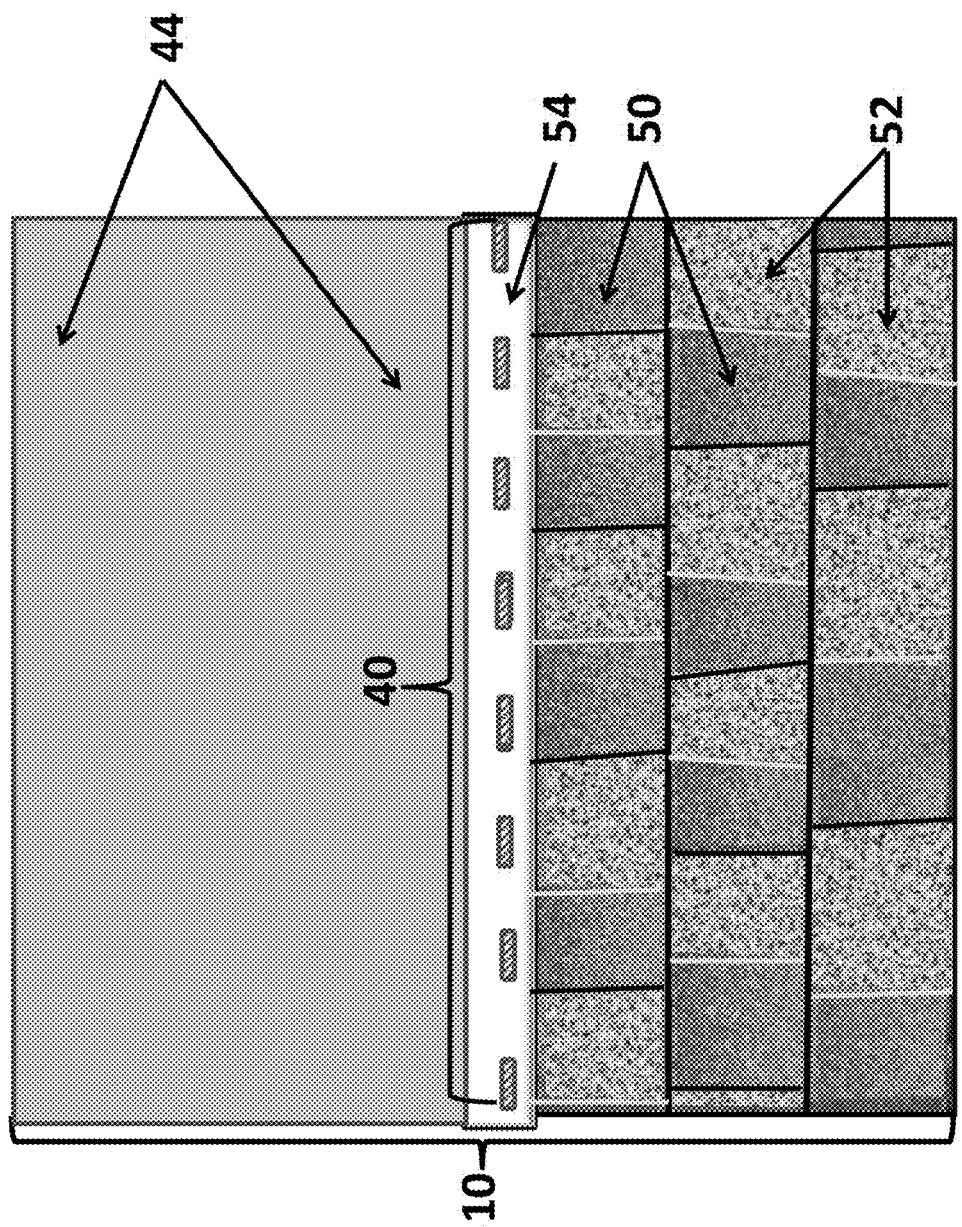
FIG. 20 demonstrates construction material 10 that has three rows of a design 50 and 52 that are exposed to the elements after application. Construction material 10 is for self-adhered applications with film 44 acting as a bonding area for bonding the next layer of self-adhered construction material 10. Film 44 also acts as a parting or release agent. Release liner 54 covers an additional layer or layers of adhesive 40 on top of a layer of self-adhered compound and or compound that permits good bonding to another layer of self-adhered membrane for rapid bonding when overlapped in that area. Release liner 54 can also act as a parting or release agent and is removed during application.

FIG. 20 demonstrates a self-adhered construction material 10 consisting of six rows of completed pattern 50 and 52 with film 44 covering the remaining area not covered with pattern 50 and 52. Film 44 can act as a bonding area and or parting or release agent as desired. Adhesive 40 is added on or near the overlap edge area to improve and provide instantaneous bonding along the overlap. Adhesive 40 can be protected by optional release liner 54 as needed or desired.

Figure 21:
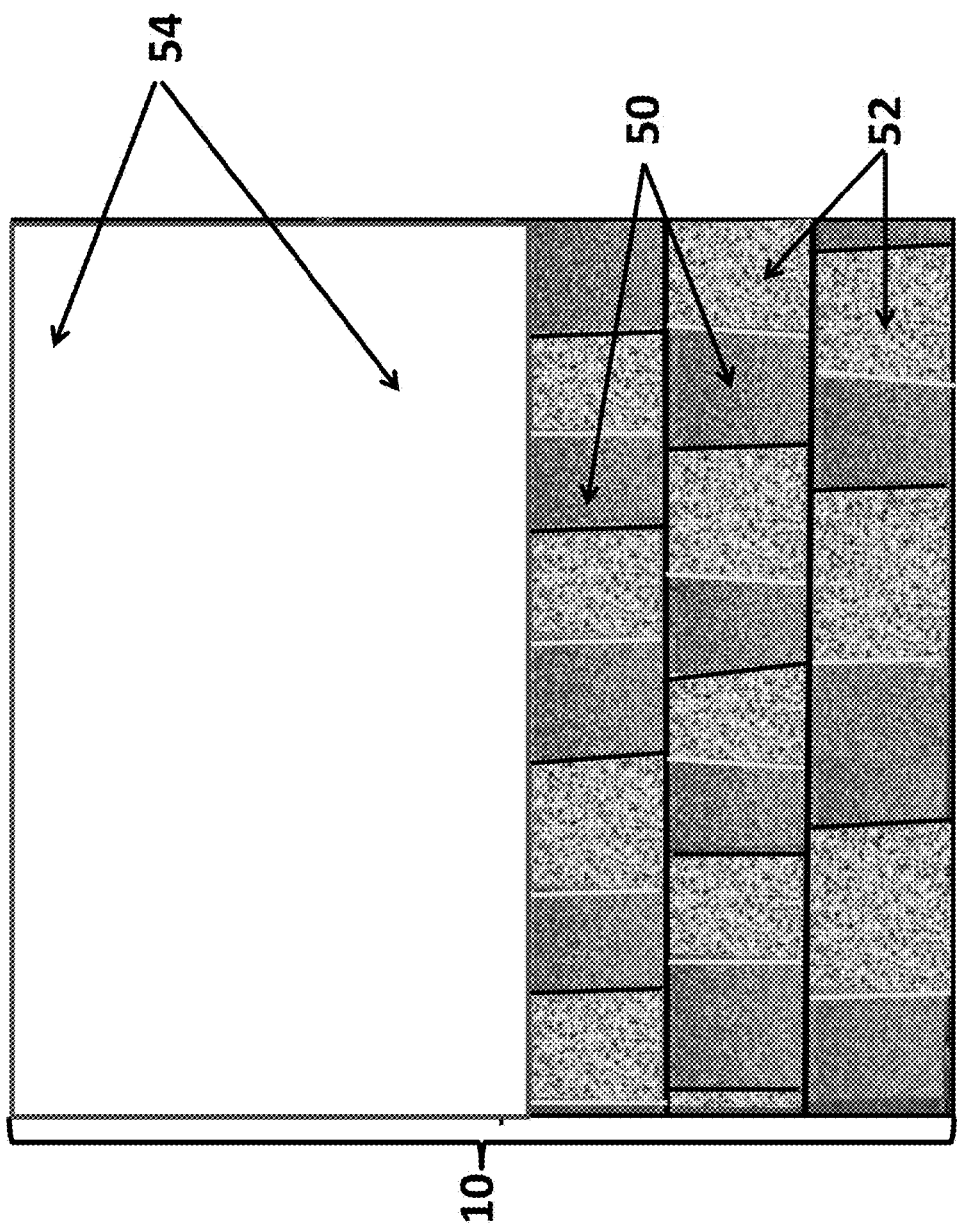
FIG. 21 shows construction material 10 that has three rows of a design 50 and 52 that are exposed to the elements after application. Construction material 10 is for self-adhered applications with release liner 54 covering a layer of self-adhered compound and or compound that permits good bonding to a self-adhered membrane when overlapped in that area. Release liner 54 can also act as a parting or release agent and is removed during application.

FIG. 21 demonstrates a self-adhered construction material 10 consisting of three rows of completed pattern 50 and 52 with release liner 54 that acts as a parting or release agent covering the remaining area not covered with pattern 50 and 52. The area under release liner 54 can be a layer of adhesive and or material and or compound that permits good bonding to a self-adhered membrane when overlapped in the area under release liner 54.

The design concept of using multiple media applicator units in conjunction to pattern rolls shown in FIG. 5 allows for full width or partial width patterns to be accomplished on the construction material depending on the construction materials intended design and use. The media applicator units can be designed for example to allow one or more rows of the pattern to be placed on the construction material by opening or closing a slide at the bottom of each media applicator unit that is not shown in the figures. An example of the apparatus and process being disclosed is depicted on the Figures. Using all six media or granule applicator units depicted on the Figures disclosed allows for the construction material to have multiple design variations. The first two pattern applicator units are designed and intended to make the pattern outline either in full width or in partial widths across the construction material by using engineering means like gates, dividers or controls that limit the amount and width of the media or granules applied by the pattern rolls. The pattern and design concept is demonstrated in the figures.

In the example presented on the figures the third and fourth pattern applicator units are designed and intended to make shading areas and or color blend variations in the pattern either in full width or in partial widths across the construction material by using engineering means such as gates, dividers, or controls that limit the amount and width of the media or granules applied by the pattern rolls that usually matches the desired width which the first two pattern or design rolls outlines. The figures clearly show possible shading or color blending areas associated with the pattern outline.

In the example presented the media applicator units without the pattern rolls are intended to cover and fill in areas in and around the pattern and shading and if desired to cover and fill areas where no design is wanted or intended. The media in these media applicator units can be similar or can be dissimilar materials. For example one media applicator unit can contain sand and the other media applicator unit can contain roofing granules or both can contain roofing granules of whatever color or blend desired as another example and so on. These media applicator units also designed to control the amount of media applied, where and when it is applied across the full or partial width of the construction material.

Some construction material designs may call for the use of a film or mat made from polyester, polypropylene, polyethylene, glass or the like in combination with the media or granule pattern design on the surface of the material. These films could also include siliconized release liners or siliconized paper that is used as a release medium for compounds or adhesives. These adhesives are typically used on the construction material for bonding purposes. If desired, self-adhered compound or compounds and or pressure sensitive adhesives can be used in and along the edges and or on the back of the material. The self-adhered material or compound can be used entirely throughout the body of the membrane or as a layer or partial layer or as dots, strips, etc. common in the construction industry in combination with other asphaltic or modified asphaltic or polymer modified bitumen and or with elastomeric, thermoplastic or polymeric materials or compounds. The films and mats or media can be placed onto the areas where no design is intended alone or in combination.

FIG. 14 shows one rendition of an example pattern that simulates a laminated designer shingle in a six row configuration for use on standard substrates in the construction industry that are about 1000 mm (1 meter or 39.4 inches) wide or that are about 914 mm (0.9 meter or 36 inches) wide so that these two standard width substrates will accommodate all 6 rows of the desired pattern. These substrates vary in weight and composition and are utilized in the building construction market today. Engineering means are in place so that fewer rows can be produced as desired across the width of the construction material. Alternately the construction material can be manufactured with custom width substrates or the construction material can be slit or cut into different widths in situ or at the factory for use as needed. The construction material design and system, how much overlap is desired, and where and how the construction material will be used, and in what combination with itself and with other construction materials will depend on the entire system design and regional codes.

Using row widths or shingle tab design dimensions different from what is indicated on the example depicted in the Figures is envisioned by this disclosure the specific dimensions of the apparatus and process disclosed are not limited by this disclosure. The size, design, and shape can be set to meet the desired effect and requirements for the particular application. And the width of the construction material can be entirely different from that for roofing to allow use of the disclosed apparatus and process for other products such as flooring, wall coverings, etc. Depending on the particular design and application the 3-D simulated design can consist of different row heights and have more or less rows of the design on a construction material that will fit either or both the 914 mm and 1000 mm standard width substrates or to use a custom substrate of a different size. Someone knowledgeable in the field could use any dimensions desired for the intended application. Using different row sizes or widths or pattern offsets of similar design and construction can be used as desired for the particular intended application.

The pattern or design roll depicted in the example shown on the Figures has six rows of the pattern or design embossed into the surface of each pattern or design roll. The 152 mm row height dimension is versatile and presented as an example in this disclosure as this row height approximates a few laminated dimensional shingles that are available in the market place today. The 152 mm row height can easily be used to make up to 6 full rows of the design pattern on standard 914 mm and 1000 mm width substrates that are commonly used in the construction industry today to manufacture roll roofing membranes and underlayments.

When double or even triple coverage of the construction material is wanted or needed (for warranty, codes, or system performance) a row height of 152 mm could be used on each of these standard substrates. For example, 3 rows of the pattern design with a row height of 152 mm, allows for double coverage of the construction material when overlapped. Triple coverage of the construction material can be obtained when it is overlapped on top of each other when only 2 rows of the design are used at this row height. When the full width of the pattern is desired on the construction material without a selvage edge, standard 914 mm wide substrate can be used with six rows of the design at a row height of 152 mm. This is an important feature of the apparatus and process disclosed and Table 2 below shows the versatility of the 152 mm row height. Other pattern row heights that could work with both standard substrates of 914 mm and 1000 mm in width are also included in Table 2.

When using a pattern design row height of 152 mm, six rows can fit easily onto a 1 meter or 1000 mm wide substrate. The area not covered by the pattern creates an overlap area often referred to as a selvage edge. This area would be about 88 mm in width when six rows of the pattern are used. If desired the use of 1000 mm wide substrate could be used and a pattern height of 154 mm would give a 76 mm selvage edge for example. A typical application of the construction material if used on a roof would start at the lower roof edge working horizontally across the roof. If the roof is wider than the length of the construction material, subsequent rolls can be butted together or partially overlapped as an example. The construction material would be applied so that the selvage edge would be away from the roof edge and toward the roof peak so that additional rows of the construction material can be applied to overlap along the selvage edge so that rain, water, snow or sleet is shed naturally off the roof.

TABLE #2

| Substrate Width | | # | Tab Size | | Coverage | | Selvage edge | | Total coverage | | # |
|---|---|---|---|---|---|---|---|---|---|---|---|
| mm | in | rows | mm | in | mm | in | mm | in | sq. m | sq. ft | Layers |
| 1000 | 39.4 | 6 | 152 | 6.0 | 912 | 35.9 | 88 | 3.5 | 9.1 | 98.1 | 1.1 |
| 1000 | 39.4 | 5 | 152 | 6.0 | 760 | 35.9 | 240 | 9.4 | 7.6 | 81.8 | 1.3 |
| 1000 | 39.4 | 4 | 152 | 6.0 | 608 | 35.9 | 392 | 15.4 | 6.1 | 65.4 | 1.6 |

TABLE #2-continued

| Substrate Width | | # | Tab Size | | Coverage | | Selvage edge | | Total coverage | | # |
|---|---|---|---|---|---|---|---|---|---|---|---|
| mm | in | rows | mm | in | mm | in | mm | in | sq. m | sq. ft | Layers |
| 1000 | 39.4 | 3 | 152 | 6.0 | 456 | 35.9 | 544 | 21.4 | 4.6 | 49.1 | 2.2 |
| 1000 | 39.4 | 2 | 152 | 6.0 | 304 | 35.9 | 696 | 27.4 | 3.0 | 32.7 | 3.3 |
| 914 | 36.0 | 6 | 152 | 6.0 | 912 | 35.9 | NA | NA | 9.1 | 98.1 | 1.0 |
| 914 | 36.0 | 5 | 152 | 6.0 | 760 | 35.9 | 154 | 6.1 | 7.6 | 81.8 | 1.2 |
| 914 | 36.0 | 4 | 152 | 6.0 | 608 | 35.9 | 306 | 12.1 | 6.1 | 65.4 | 1.5 |
| 914 | 36.0 | 3 | 152 | 6.0 | 456 | 35.9 | 458 | 18.0 | 4.6 | 49.1 | 2.0 |
| 914 | 36.0 | 2 | 152 | 6.0 | 304 | 35.9 | 610 | 24.0 | 3.0 | 32.7 | 3.0 |
| 1000 | 39.4 | 5 | 183 | 7.2 | 914 | 43.2 | 86 | 3.4 | 9.1 | 98.3 | 1.1 |
| 1000 | 39.4 | 4 | 183 | 7.2 | 731 | 43.2 | 268.8 | 10.6 | 7.3 | 78.7 | 1.4 |
| 1000 | 39.4 | 3 | 183 | 7.2 | 548 | 43.2 | 451.6 | 17.8 | 5.5 | 59.0 | 1.8 |
| 1000 | 39.4 | 2 | 183 | 7.2 | 366 | 43.2 | 549 | 21.6 | 3.7 | 39.3 | 2.7 |
| 914 | 36.0 | 5 | 183 | 7.2 | 914 | 43.2 | NA | NA | 9.1 | 98.3 | 1.0 |
| 914 | 36.0 | 4 | 183 | 7.2 | 731 | 43.2 | 183 | 7.2 | 7.3 | 78.7 | 1.3 |
| 914 | 36.0 | 3 | 183 | 7.2 | 548 | 43.2 | 366 | 14.4 | 5.5 | 59.0 | 1.7 |
| 914 | 36.0 | 2 | 183 | 7.2 | 366 | 43.2 | 549 | 21.6 | 3.7 | 39.3 | 2.5 |
| 1000 | 39.4 | 4 | 229 | 9.0 | 914 | 54.0 | 86 | 3.4 | 9.1 | 98.3 | 1.1 |
| 1000 | 39.4 | 3 | 229 | 9.0 | 686 | 54.0 | 314.5 | 12.4 | 6.9 | 73.8 | 1.5 |
| 1000 | 39.4 | 2 | 229 | 9.0 | 457 | 54.0 | 457 | 18.0 | 4.6 | 49.2 | 2.2 |
| 914 | 36.0 | 4 | 229 | 9.0 | 914 | 54.0 | NA | NA | 9.1 | 98.3 | 1.0 |
| 914 | 36.0 | 3 | 229 | 9.0 | 686 | 54.0 | 229 | 9.0 | 6.9 | 73.8 | 1.3 |
| 914 | 36.0 | 2 | 229 | 9.0 | 457 | 54.0 | 457 | 18.0 | 4.6 | 49.2 | 2.0 |
| 1000 | 39.4 | 3 | 305 | 12.0 | 914 | 72.0 | 86 | 3.4 | 9.1 | 98.3 | 1.1 |
| 1000 | 39.4 | 2 | 305 | 12.0 | 609 | 72.0 | 305 | 12.0 | 6.1 | 65.6 | 1.6 |
| 914 | 36.0 | 3 | 305 | 12.0 | 914 | 72.0 | NA | NA | 9.1 | 98.3 | 1.0 |
| 914 | 36.0 | 2 | 305 | 12.0 | 609 | 72.0 | 305 | 12.0 | 6.1 | 65.6 | 1.5 |
| 1000 | 39.4 | 2 | 457 | 18.0 | 914 | 108.0 | 86 | 3.4 | 9.1 | 98.3 | 1.1 |
| 914 | 36.0 | 2 | 457 | 18.0 | 914 | 108.0 | NA | NA | 9.1 | 98.3 | 1.0 |

The media or granule applicators are engineered with gates, dividers and or engineering controls so that the pattern or design roll can apply a portion of the pattern width or the full pattern width on the construction material in any location or position on the construction material. For example two rows of the design pattern can be put on each edge leaving an area in the middle of the construction material uncovered if desired or two rows can be put in the middle of the construction material leaving both edges without a pattern. Three rows of the design pattern can be put onto the construction material on one edge leaving about half the construction material without a design pattern or these 3 design pattern rows can be placed in the middle of the construction material if desired. This is advantageous for ease of installation in roof valleys and or crickets and or around other roof structures. One can imagine other row configurations not listed but are intended as part of this patent.

Additional applications/embodiments are as follows.

Figure 22:
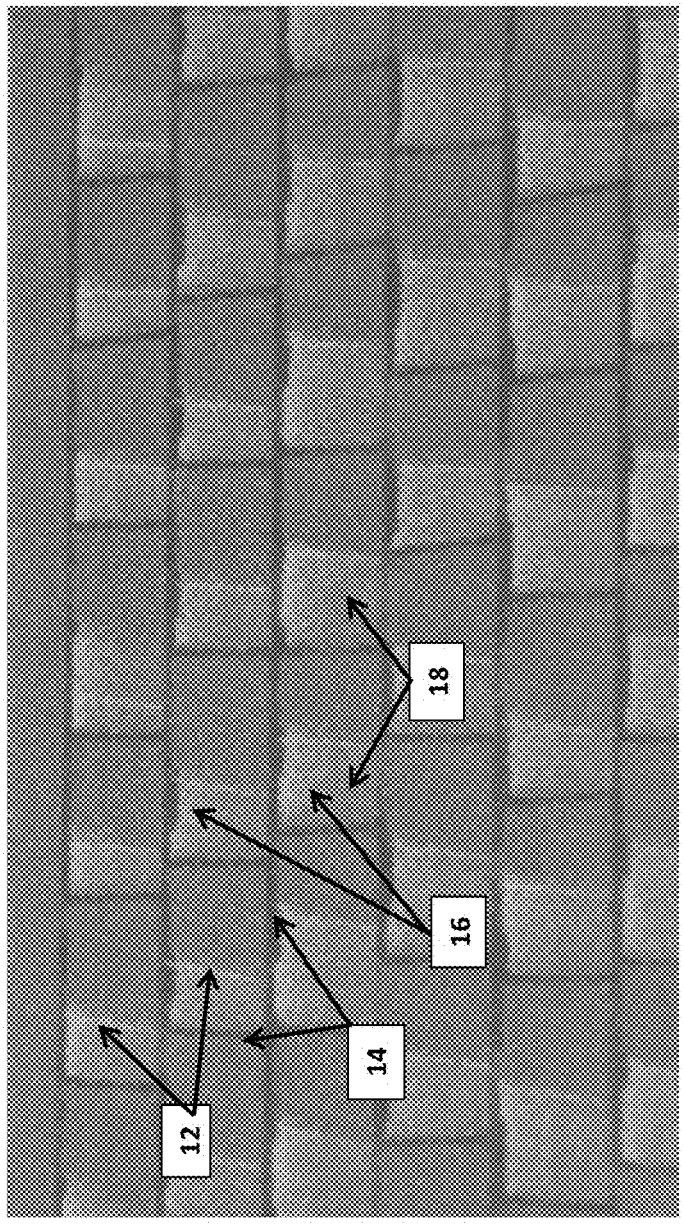
FIG. 22 is a picture of a simulated 3 dimensional full width concept of an architectural designer laminated shingle design pattern on the construction material without a selvage edge for various applications, for example in valleys and roof ridges.

FIG. 22 is a picture of a simulated three dimensional full width concept of an architectural designer laminated shingle design pattern on the construction material without a selvage edge for various applications, for example in valleys and roof ridges. Master pattern applicator roll 32 applied the light colored media edge 12 having a sieve size around and about that of a #14 or #18 roofing granule. Slave pattern applicator roll 34 created the dark outline 14 using dark colored media having a sieve size around and about that of a #14 or #18 roofing granule to create the shingle tabs of a laminate shingle. Pattern roll 36 applied light blended colored media for the upper shading areas 16 having a sieve size around and about that of a #14 or #18 roofing granule and pattern roll 38 used darker blended colored media for lower shading areas 18 having a sieve size around and about that of a #14 or #18 roofing granule to create contrast under the lighter upper shading area. Applicators 28 and 30 applied blended colored media having a sieve size of and about that of #11 sized roofing granules to fill in the remaining areas to create the 3-D laminated shingle design.

Figure 23:
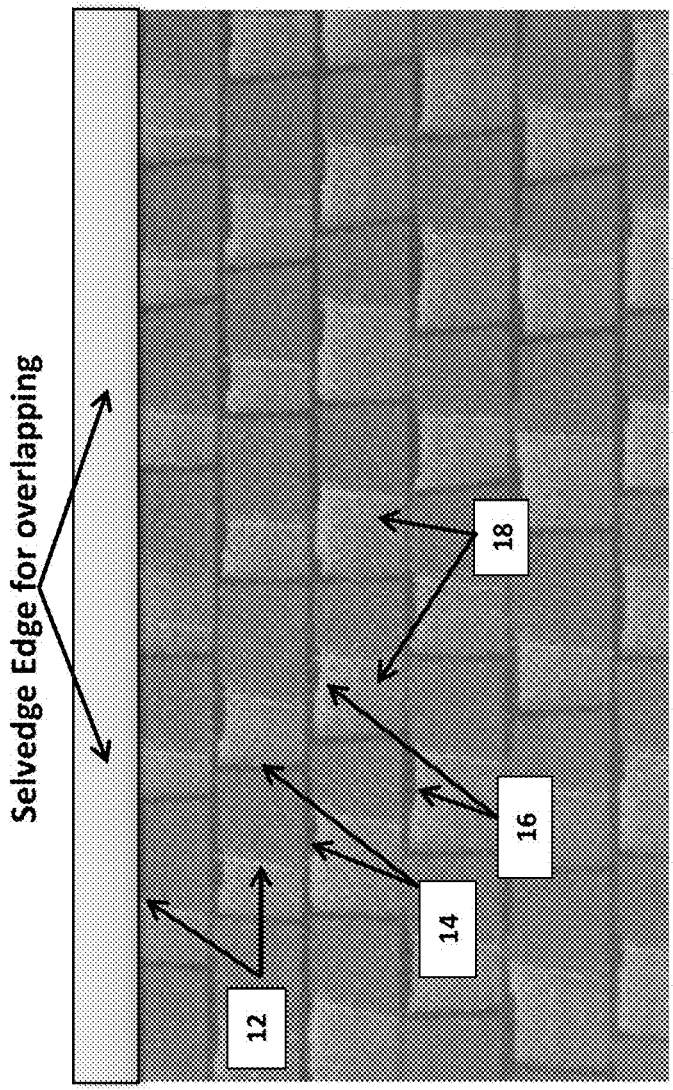
FIG. 23 is a picture of a simulated full width concept of the construction material with a selvage edge area intended for overlapping the next layer.

FIG. 23 is a picture of a simulated three dimensional full width concept of an architectural designer laminated shingle design pattern on the construction material with a selvage edge area intended for overlapping the next layer. Master pattern applicator roll 32 applied the light colored media edge 12 having a sieve size around and about that of a #14 or #18 roofing granule. Slave pattern applicator roll 34 created the dark outline 14 using dark colored media having a sieve size around and about that of a #14 or #18 roofing granule to create the shingle tabs of a laminate shingle. Pattern roll 36 applied light blended colored media for the upper shading areas 16 having a sieve size around and about that of a #14 or #18 roofing granule and pattern roll 38 used darker blended colored media for lower shading areas 18 having a sieve size around and about that of a #14 or #18 roofing granule to create contrast under the lighter upper shading area. Applicators 28 and 30 applied blended colored media having a sieve size of and about that of #11 sized roofing granules to fill in the remaining areas to create the 3-D laminated shingle design.

Figure 24:
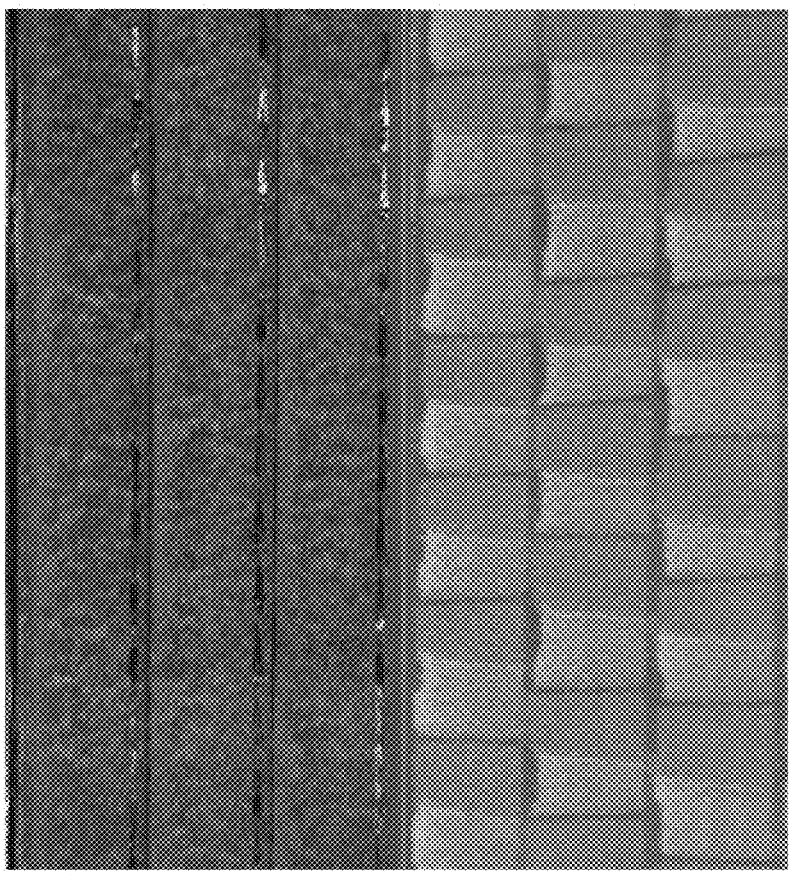
FIG. 24 is a picture of a simulated half width concept of the construction material that has adhesive in three rows for bonding the next layer.

FIG. 24 is a picture of a simulated half width concept of the construction material that has heat or pressure activated adhesive in three rows for bonding the next layer of construction material. The construction material is mechanically applied with roofing nails, screws, stables, etc. by means known in the industry. The construction material in this picture uses sand as a parting or release agent on which has been slightly pressed into the surface of the construction material when it is still malleable on which the adhesive is then placed. The half width version as well as other versions could just as easily have granules, film and or release liner or other parting or release agents known in the industry like mica, talc and the like instead of the sand that is shown in FIG. 24 as the parting or release agent.

Creating a construction material that has a 3-D design pattern applied onto the surface that emulates a 3-D laminated shingle is described in the following paragraphs as one feature of this apparatus and process disclosed. Those educated in the art of making construction materials particularly roofing and or siding membranes or materials will immediately understand the benefits of the apparatus and process disclosed and the concepts disclosed are intended to cover other pattern designs that intend to emulate and mimic other 3-D construction materials.

The master pattern applicator roll applies the first segment or section of the pattern. In the case of a 3-D laminated architectural shingle design the first segment would be the leading edge or the trailing edge of a shingle tab in as many rows as desired. The width between these edges can be varied by changing the rotational speed of the master pattern applicator roll in relation to the line speed. The second granule pattern applicator roll applies the remaining pattern outline and is a slave to the master pattern applicator roll. Breaking the pattern into different segments in this way can allow for a random pattern appearance by varying the rotational speed of this master pattern applicator roll. Also the rotational speed of the master pattern roll applicator does not need to be synchronized to the production line speed or the speed of the continuous sheet or material as the second pattern applicator roll that applies the remaining pattern outline is synchronized to this master pattern applicator roll.

The width between the segments or edges applied by the master pattern roll applicator does not need to vary in width significantly for the pattern to have a random look and avoid the repetitive fixed pattern that can form a zipper line or zig zag pattern. A variation of rotational speed of +/−50% or even +/−25% or even +/−10% or even +/−1% compared to the speed of the production line or speed of the continuous sheet could make a significant difference to the design of the pattern and more precisely the 3-D simulated architectural laminate shingle tabs.

The media or granules used by the master pattern applicator roll to make the first segment or section of the desired 3-D design pattern is preferably lighter in color or shade then the rest of the media used to make the remaining pattern, pattern outline, shade areas and fill areas. The media used for the first segment can be a single color like white, tan, yellow or grey for example or light colored media can be blended together and or added alone or in combination to darker media to make a blend of colors that will have at least 10 percent by weight of the light colored media or at least 3 percent by volume of the light colored media particularly if light weight media is used for this purpose.

For example, when making the 3-D simulated laminated shingle design, the master pattern applicator roll applies light colored media to a moving sheet so that the first section or segment imitates the leading or trailing edge of a shingle tab. The use of light media and or light media blended with darker media for this section or segment is intended to mimic the sun striking this leading or trailing edge of the shingle design on the construction material. This lighter edge gives depth of field and vision for better contrast so that the flat design made on the construction material when viewed has a significantly better 3-D effect in order to better emulate an actual laminated architectural dimensional shingle.

Figure 25:
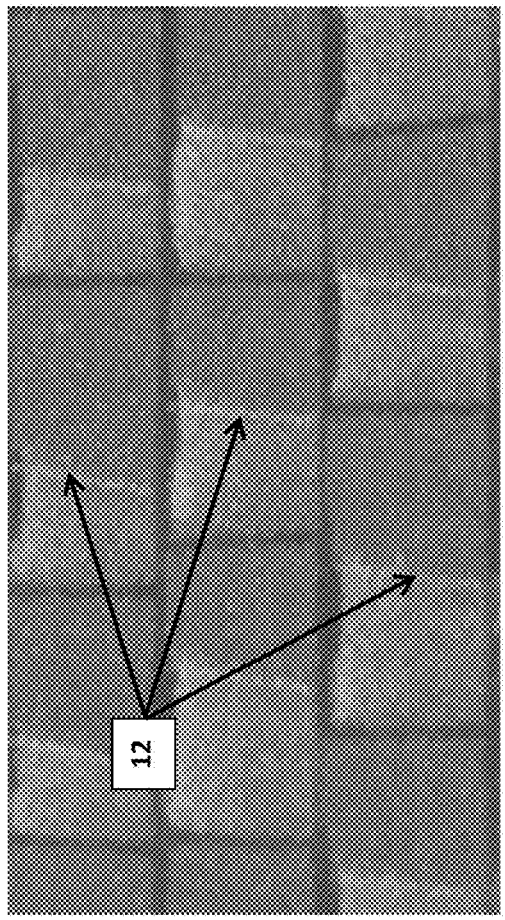
FIG. 25 shows a picture of the concept of the lighter leading edge.

FIG. 25 shows a picture of the concept of the lighter leading edge.

The media used in the second applicator roll that is a slave to the master or first pattern applicator roll is used to make the remaining pattern and is preferably a dark color like black, dark brown or dark grey for example or darker colored blended media to aide in the contrast between the light media applied by the master pattern applicator roll and the dark color applied by the second pattern roll. Often the media or granules used to make the remaining pattern outline applied by the second media pattern roll are darker in color than the media used for the remaining pattern areas and the media used for the fill areas. The media can be made of a single color or a blend of colors depending on the design.

Figure 26:
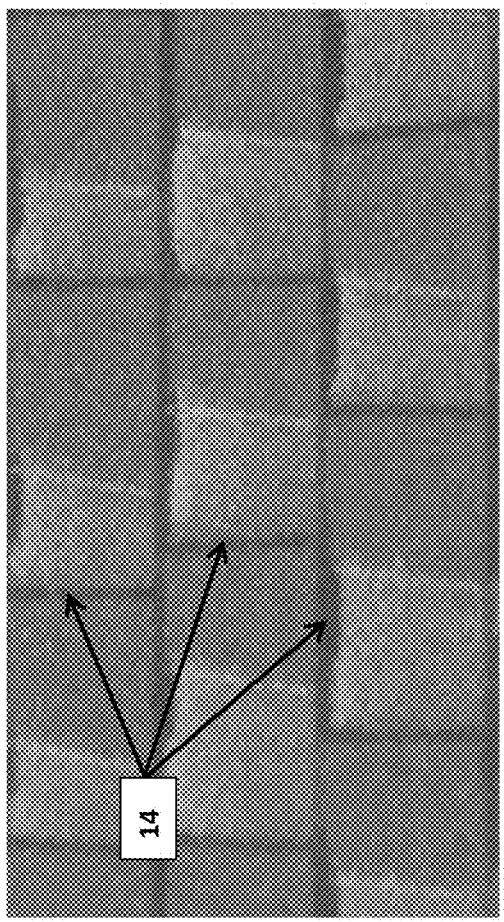
FIG. 26 shows a picture of a concept of the dark media making up the remaining pattern applied by the second pattern roll in contrast to the light media used for the first section or segment and the media used for the shading and fill areas.

FIG. 26 shows a picture of a concept of the dark media making up the remaining pattern applied by the second pattern roll in contrast to the light media used for the first section or segment and the media used for the shading and fill areas.

The third media or granule pattern applicator roll that is the slave to the first or master applicator roll applies part or the entire upper shading area at selected alternating areas of the design pattern and can also apply media in other sections of the pattern as desired. In the case of the 3-D simulated laminated shingle this shading area would cover several alternating shingle tabs to simulate the design of the laminated architectural shingles in the market place today. The media or granules used for the upper shading area depicted on FIG. 26 are dark in color similar to the outline applied by the second pattern applicator roll. Or the granules can be lighter in color so long as the two shading areas contrast in color, intensity, tint, tone or shade or they can be a blend of black or dark colors added to lighter media or granules so that this shading area will be apparent when viewing the construction material. Or the granules could be light colors used alone or in blends to add contrast to the lower shading areas.

The amount of dark or light colored media that added to the media colors can vary with each design but preferably at least 5% of the granules used for the shading areas will be dark or light in color depending on the design preference. The upper shading area gives dimension and contrast to the 3-D design pattern for a more pleasing look. Contrast means a visible difference between two or more objects and in this case colors or color blends. This includes differences in hue, value, tone, intensity, saturation or shade and is clearly demonstrated in FIG. 27 and FIG. 28.

Figure 27:
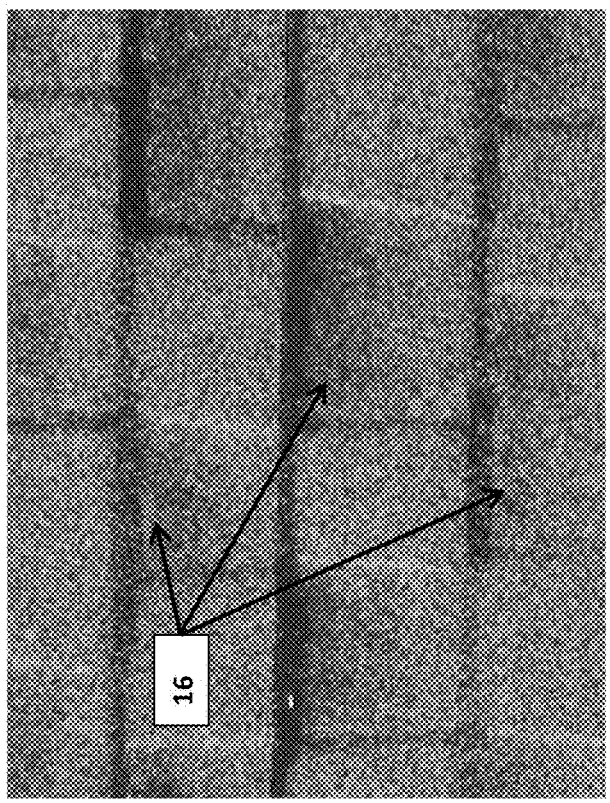
FIG. 27 shows a picture of a concept of the upper shading area where darker media was added into a color blend to create a darker blended colored media to create contrast.

FIG. 27 shows a picture of the upper shading area where darker media was added into a color blend to create a darker blended colored media to create contrast.

Figure 28:
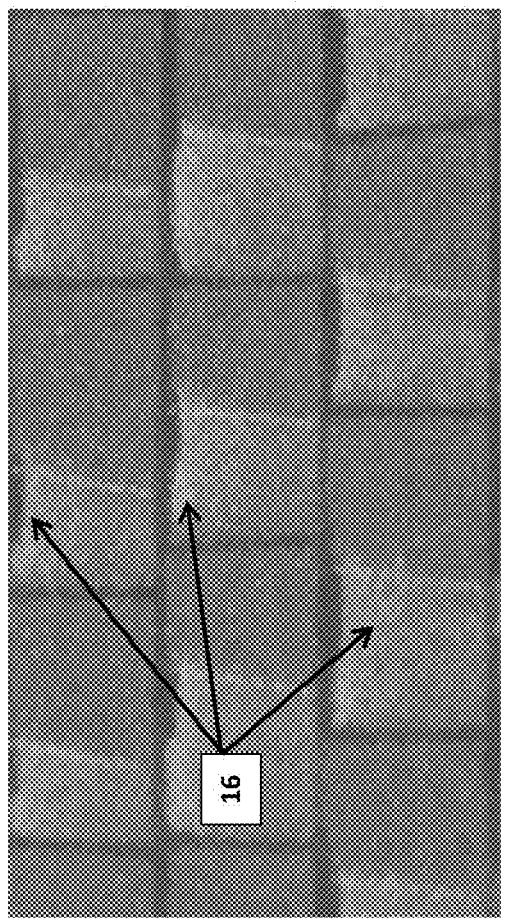
FIG. 28 shows a picture of a concept of the upper shading area where lighter media was added into a color blend to create a lighter blended colored media to create contrast.

FIG. 28 shows a picture of the upper shading area where lighter media was added into a color blend to create a lighter blended colored media to create contrast.

The fourth pattern applicator roll would be a slave to the first or master pattern applicator roll and applies a partial overlay onto the upper shading area as desired. The fourth pattern applicator roll also applies a lower shading section below the upper shading area so that both shading areas are predominately lined up and or synchronized to be in one area of the pattern design and can also apply media in other sections of the pattern as desired. The lower shading area is a preferred part of most pattern designs and is intended to enhance the design by adding contrast to the pattern particularly to the 3-D simulated laminated architectural shingle shown as an example and in FIGS. 27, 28 and 29.

To achieve a look that is more aesthetically pleasing and has a better overall 3-D affect the media used for the fill areas that is applied preferably with media applicator unit 30 shown in FIG. 1 should be a blend of two or more colors and more preferably a blend of three or more colors. To obtain the preferred media contrast between the upper shading area and the lower shading area and still have the shading areas compliment the fill media color blend, the media used for the upper and lower shading areas can contain one, two, three or all of the same media colors used for the fill areas blended in different proportions to each other and or lighter or darker color or colored media like white, grey, black, brown etc. can be blended with one, two, three or all of the same media colors used for the fill areas to achieve the desired design. However, the media and or media blend that is used for the upper and or lower shading areas should contain at least one and preferably two of the colors used for and in the fill area. The lower shading area should contrast and or be distinguished from the upper shading area and the shading areas should complement the fill area so that the media used in one of the shading areas is to some extent lighter in color or shade then the media used for the fill areas and the media used for the other shading areas is to some extent darker in color or shade then the media used for the fill areas. This has been demonstrated in the Figures.

It should be stated that media applicator unit 28 can be programmed to apply media randomly to the construction material to give the construction material a more diverse look. By applying media at random will add variety to the construction material and better simulate a 3-D laminated shingle offered in the market today. If the media in applicator 30 is a blend of three colors for example, than one can imagine that the media in applicator 28 can be one of these colors, a blend of two of the colors, a blend of all three of these colors but used in different proportions than what is used in applicator 30 or a different color or blend of colors to add contrast or lightness or darkness to the fill media. This randomization of applicator 28 is unique to this patent when used in conjunction with applicator 30.

Figure 29:
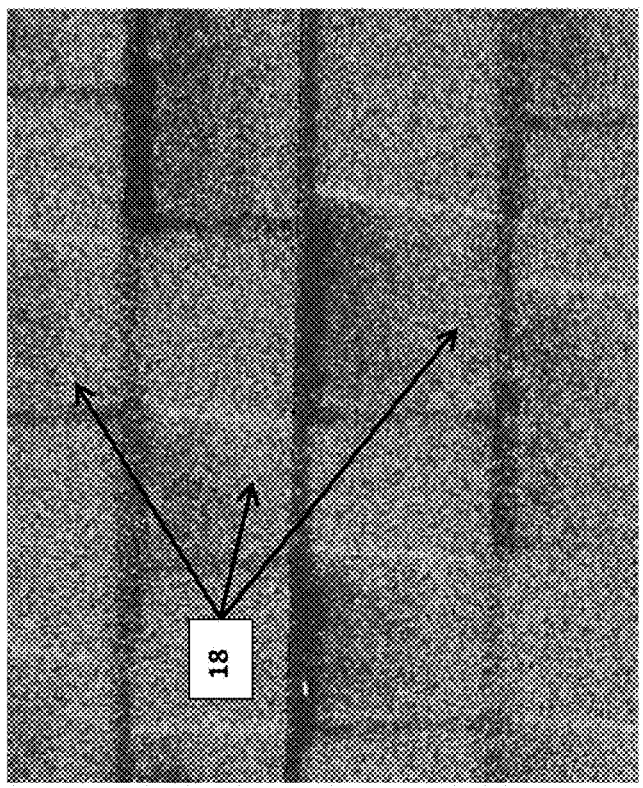
FIG. 29 shows a picture of a concept of the lighter lower shading area in contrast to and below the upper darker shading area while complimenting the fill areas.
Figure 30:
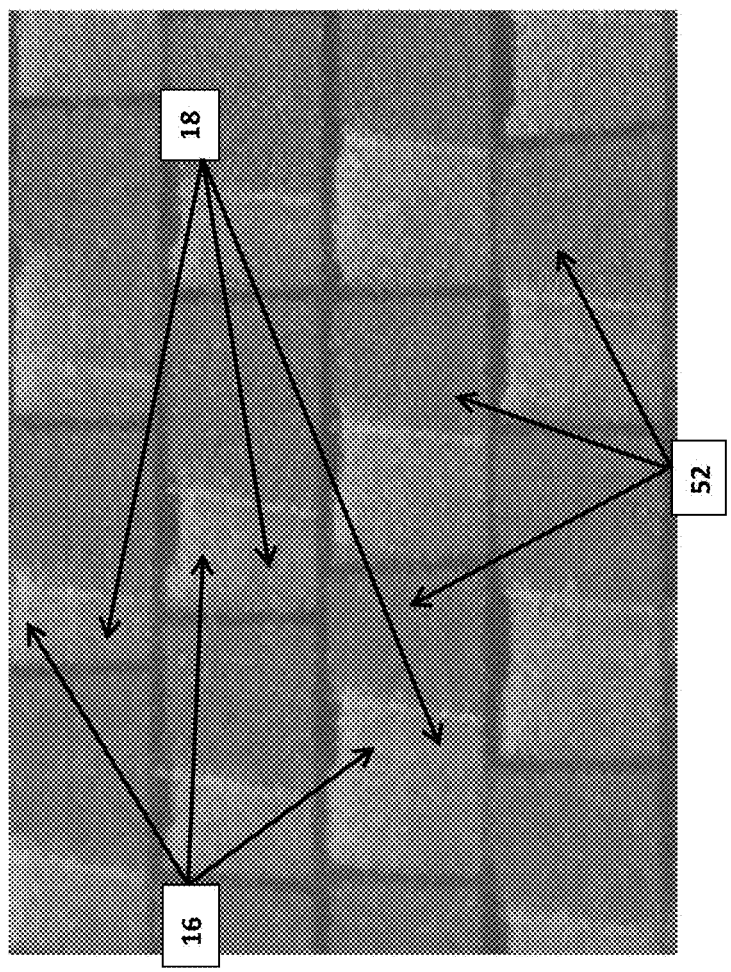
FIG. 30 shows a picture of a concept of the lower shading area in contrast to and below the upper shading area while complimenting the fill areas.

FIG. 29 shows a picture of the lighter lower shading area in contrast to and below the upper darker shading area while complimenting the fill areas FIG. 30 shows the lower shading area in contrast to and below the upper shading area while complimenting the fill areas. The lighter leading edge and the darker pattern outline is clearly demonstrated in this figure.

The Figures disclosed present the results of using different colors, tones, values, tints and shades to achieve a 3-D pattern and particularly the three dimensional simulated laminate architectural shingle used as an example becomes recognizable to those trained in the art. The unique use of the master pattern applicator roll and the slave pattern applicator rolls that are designed to work in conjunction with each other is evident also.

An important aspect of the apparatus and method disclosed is the use of different sized media other than the standard #11 sieve size granules to make the pattern design, shading and fill areas. It was discovered that using smaller media with a sieve size similar to #14 or #18 standard roofing granules shown in Table 1 for the pattern applicator rolls created a pattern that was sharper and more clearly defined. This is particularly true when the smaller #14 and #18 media were used for the master pattern applicator roll applicator 32 and slave pattern applicator roll applicator 34 that makes in our example the edge 12 and outline edges 14 of the pattern. Using the smaller #14 or #18 granules for the upper and lower shading areas as well as for the fill areas gave a preferred appearance for the simulated 3-D laminated architectural shingle on the construction material. The overall pattern has a sharper appearance and is more distinct so that the eye is tricked into believing the pattern is three dimensional by the use of different colors, tones, values, tints and shades. The use of the smaller #14 and #18 sized media or granules have been found to be particularly advantageous for this purpose. When using the smaller #14 and #18 sized media the overall weight of the construction material was reduced by about 1 kg/square meter then when #11 sized media was used and the granule adhesion and retention when tested in accordance with ASTM test method D 4977 resulted in an average granule loss of less than 0.3 grams.

The use of larger media or granules like standard #11 sieve size granules will also work to make a pattern and design as they are used in the industry today but they are not the preferred sized media particularly for use to make the pattern outline used in master pattern applicator roll applicator 32 and slave pattern applicator roll applicator 34. The #11 sized media if used was found to work better when used in the shading areas 16 and 18 and fill areas 52 and more preferably in fill areas 52 only. One can imagine using blends of larger and smaller media and granules for the pattern or design areas also. The smaller #14 or #18 sieve size granules or media are not entirely necessary for the design to work but can make the 3-D simulated design pattern more aesthetically pleasing to the eye.

Several examples of designs using different sieve size media for example granules, coal slag, colored sand, glass or other minerals or materials commonly used in the industry that are in the sieve size ranges found in Table 1 for standard #11, #14 and #18 roofing granules are listed below. For convenience the term "smaller media" will refer to sieve sizes that are smaller than standard #11 sieve size roofing granules and the term "larger media" will refer to sieve sizes equal to or larger that standard #11 sieve size roofing granules shown in Table 1.

EXAMPLE #1

In one design example of this patent, smaller media was used to make the first segment edge 12, the remaining pattern outline 14, the top and lower shading areas 16 and 18 and the fill areas 52.

EXAMPLE #2

In one design example of this patent, smaller media was used to make the first segment edge 12, the remaining pattern outline 14, the top shading area and the lower shading area 16 and 18 and larger media was used for the fill areas 52.

EXAMPLE #3

In one design example of this patent, smaller media was used to make the first segment edge 12, the remaining pattern outline 14 and the top shading area 16 and larger media was used for the lower shading area 18 and the fill areas 52.

EXAMPLE #4

In one design example of this patent, smaller media was used to make the first segment edge 12 and the remaining pattern outline 14 and larger media was used for the top shading area 16, lower shading area 18 and the fill areas 52.

EXAMPLE #5

In one design example of this patent, larger media was used to make the first segment edge 12 and the remaining pattern outline 14, the top shading area 16, lower shading area 18 and the fill areas 52.

Although the examples above refer to media as granules, the media can be sand, pumice or other colored or natural rock or mineral, paint, ink or the like.

An important aspect of this patent is the balance of color and granule size needed to achieve the best 3-D pattern and in the example the best 3-D simulated laminated architectural shingle possible while maintaining and achieving a granule press to achieve a 2 gram rub loss or better as mandated in several ASTM specifications like ASTM D6222, ASTM D6164 and ASTM D6163 to name a few. These ASTM specifications are for polymer modified bitumen membranes that use either polyester or glass substrates. The use of polyester substrates could offer a significant improvement in tensile, elongation, tear and hail resistance over conventional 3-Tab or even laminated architectural shingles that use glass mat as a substrate.

In order to make the construction material more hail resistant there is an advantage to using a polymer modified asphalt to construct the material with the 3-D simulated laminated shingle design on or pressed into it. It is widely known that laminated shingles have better wind up lift and hail resistance compared to standard 3-tab shingles primarily due to the two layer construction and added weight of the laminated shingles. Recently a report (ISAP Paper #45) was presented at the 2016 ISAP Symposium held in Jackson Hole, Wyo. from July $18^{th}$-$22^{nd}$ in conjunction with the $53^{rd}$ Peterson Asphalt Research Conference. The speaker who communicated this paper was Heather E. Estes from the Insurance Institute for Business and Home Safety discussing the better performance of Polymer Modified Asphalt (PMA) shingles over laminate shingles for wind uplift and hail resistance. Below is an excerpt from that paper:

Durability of Polymer Modified Asphalt Shingles

Heather E. Estes[1], Tanya M. Brown-Giammanco, Ph. D.[2], Ian M. Giammanco, Ph. D.[3]

[1-3] Insurance Institute for Business & Home Safety, 5335 Richburg Rd. Richburg, S.C. 29729, USA, hestes@ibhs.org, tbrown@ibhs.org, igiammanco@ibhs.org The Insurance Institute for Business & Home Safety (IBHS) Research Center is a multi-peril applied research and training facility in Richburg, S.C. The IBHS Research Center tests building components and systems against natural hazards including wind, hail, wildfire, and wind-driven rain. In 2013, IBHS began investigating the impact resistance and wind performance of asphalt shingles. Preliminary results indicated polymer modified asphalt (PMA) impact resistant (IR) shingles may perform better than basic oxidized and traditional IR oxidized shingles in both impact and wind tests. This study seeks to investigate the mechanical and physical properties of asphalt shingles that may cause increased impact and wind resistance. IBHS is collaborating with the asphalt shingle industry and other labs to understand possible relationships between binder properties and durability, performance, oxidation and modification. The project seeks to define components and characteristics of, and to develop a minimum standard for PMA shingles. Work is ongoing, and results presented here are preliminary, serving as indicators for progress in relating durability test to analytical and materials testing.

In 2013, IBHS began investigating the impact resistance of asphalt shingles using the UL 2218 steel ball impact test and FM 4473 High Impact Ice Hail Test. Initial tests of 22 off-the-shelf asphalt shingles, including three PMA shingles, indicated PMA/IR shingles performed better than non-IR shingles and traditional IR oxidized shingles. Additionally, IBHS conducted ASTM D3161 wind tests to assess the wind performance of 26 off-the-shelf asphalt shingles, including four PMA shingles. Results from these initial tests indicated the sealant strip adhesion was key in determining the wind resistance. However, if the shingles became unsealed during the tests, PMA shingles were better able to reseal and self-heal without creasing or cracking like the oxidized asphalt shingles.

The paper presented by the Insurance Institute for Business & Home Safety (IBHS) disclosed that the Polymer Modified Asphalt (PMA) shingles that were subjected to UL 2218 and FM 4473 Hail Impact testing and ASTM D3161 Wind Uplift tests out performed laminated designer architectural shingles in many aspects of the testing protocols including the ability of the PMA shingles to reseal if they happen to have some minor creasing of the tabs during the wind uplift testing.

One can postulate that the construction material of this apparatus and method disclosed made in lengths of 5 meters or 8 meters or even 10 meters or more made of similar or even the same PMA material tested in small pieces like these Polymer Modified Asphalt shingles would perform the same or even better in both hail and similar or even better in the ASTM D3161 Wind Uplift testing as it would take significantly more wind force to lift a five or even a ten meter long roll of Polymer Modified Asphalt construction material with a pattern like the 3-D simulated laminated shingle design pattern on it since the construction material could weigh in the neighborhood of about 1.5-9.0 Kg/square meter and have a thickness between 2.0 and 5.0 mm whereas the individual pieces of PMA laminate shingles weigh about 0.1-0.9 kg each.

The application of the new apparatus and process disclosed for construction material with the 3-D simulated design pattern is also an important feature to the apparatus and process disclosed as it must be easy to apply, require the same or less time and labor to install and offer the contractor and homeowner and advantage over conventional 3-Tab or laminated shingles offered in the market place today. Several design elements and Figures of these designs including rolls that have a pattern or design that is full width with or without a will edge and even a roll with the pattern on only half the roll have been disclosed already. These ideas will now be explored in more detail.

Roofers today utilize pneumatic nail guns, staplers and the like to install conventional shingles. Shingles also have self-sealing tab adhesive applied in certain areas of the shingle to maximize the bonding of one shingle tab to another shingle in an effort to make the roof monolithic after bonding the shingles together usually after one or more thermal cycle. Shingles are applied in all types of climates and during the cold months it may take conventional shingles several days, weeks or even months before the shingles are fully bonded together to ensure maximum wind uplift resistance of the roofing material. The advent of self-adhering modified bitumen compound and rolls as well as pressure sensitive adhesives have recently found its way into the shingle market to help combat the slow sealing of the tab adhesive in colder climates and in an effort to help reduce labor and time of installing conventional shingles.

There are several ways to apply self-adhered or self-sealing adhesive to the construction material. During the manufacturing process this mat or substrate is saturated and or coated with asphaltic and or modified asphaltic or modified bitumen compound or thermoplastic or elastomeric polymers alone or in combination in one or more steps. The coated mat can then be recoated with asphaltic and or modified asphaltic or modified bitumen compound or thermoplastic or elastomeric polymers alone or in combination in one or more steps as desired or needed to obtain the desired weight and thickness of the construction material. The coated and or recoated mat is then passed rolls, scrapers or the like known in the industry to obtain the desired product thickness.

Sometimes the compound used to coat or recoat the mat is formulated to be a self-adhered compound. Other times only a portion of the construction material has self-adhered compound on it. This self-adhered compound can be made from various polymers and tackifiers known to those that formulate this type of compound. When only a portion of the construction material has self-adhered compound on it typically a scraper or the like removes compound that was used to coat or recoat the material and the self-adhered compound is applied by use of an inking roll, extruder or by transfer technology to name a few techniques known in the industry. An example of this type of technology can be found in U.S. Pat. No. 6,696,125 B2, granted to Zanchetta, et al.

Self-adhered compound also known as pressure sensitive adhesive and self-sealing adhesive known in the industry as shingle tab adhesive can be placed onto the construction material with or without removing material by scraping or the like. Typically self-adhering and self-seal adhesives are placed on top of a parting or release agent like sand, mica, talc or the like known in the industry by extrusion, roll inking, transfer technology or the like that is common in the industry.

Sometimes the self-adhering pressure sensitive adhesive is applied directly to the compound in order to serve as a place where instantaneous adhesion between overlapping sections is desired. An example of this type of technology is found in U.S. Pat. No. 6,924,015 B2 granted to Zanchetta, et al.

The techniques and methods of applying modified bitumen rolls with self-adhering compound and or pressure sensitive adhesive can now be combined with conventional shingle and roll application methods and be integrated into the application methods used to create unique construction material that has a 3-D pattern particularly a simulated 3-D laminate architectural shingle design on it.

One embodiment of the apparatus disclosed comprises
a minimum of 2 applicator units comprising a master applicator unit and a minimum of 1 slave applicator unit arranged in series with the master applicator unit;
a pattern roll in the master applicator unit and in each slave applicator unit wherein each pattern roll dispenses a selected design pattern section;
all the applicator units located above a structure;
a material which passes over the structure and under each applicator unit located above the structure and the material;
a material speed controller for the material passing under the applicator units;
a master speed controller for the master applicator unit;
a slave speed controller for each slave applicator unit; and
a reference point created on each pattern roll for coordinating the master speed controller and each slave speed controller wherein the slave speed controller for each slave applicator unit is coordinated with the master speed controller for the master applicator unit.

In another embodiment the minimum of 2 applicator units in the apparatus further comprises at least 1 media applicator unit in series with the master applicator unit and the minimum of 1 slave applicator units. The media applicator units can have engineering control mechanisms to control the amount of media applied across the full or partial width of the material. The apparatus can further comprise a speed controller for each media applicator unit which may be coordinated with the master controller if desired. An algorithm can be programmed to control each slave applicator unit based on a rotational speed of the master applicator unit, a diameter of the pattern applicator rolls, and a speed of the material.

The material on which a design is inscribed can be a construction material such as roofing and emulating a shingle. The construction material can have a selvage edge surfaced with a parting agent and an adhesive applied as desired for bonding to an adjacent surface after installation.

Figure 31:
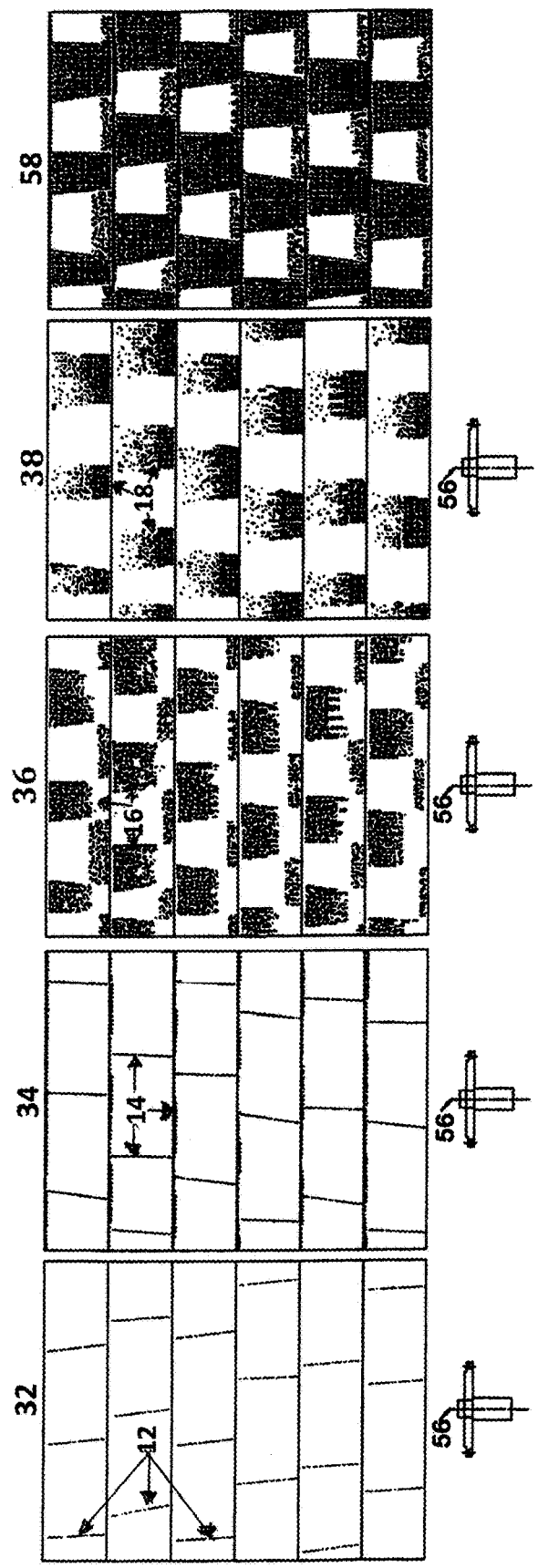
FIG. 31 shows a drawing using a computer aided design program showing master pattern applicator roll 32 with six rows of first segment 12, slave pattern applicator roll 34 with six rows of second segment 14, slave pattern applicator roll 36 with six rows of upper shading segments 16, slave pattern applicator roll 38 with six rows of lower shading segments 18 and assembled view 58 showing six rows of the combined pattern segments.

An example of steps for consideration for making a 3-D design on a flat surface:
1) Choose the product you wish to emulate.
2) Examine the product in the intended environment
3) If possible install the product as per the manufacturer's instructions.
4) Take photographs at various times of the day to best understand the effect the sun is having on the product to determine what areas are in shadow, what areas are brighter, etc.
5) Use a computer aided design program to simulate the product to be emulated.
6) Determine the overall size and dimensions of the product to be emulated.
7) Determine how many rows or designs parts that will fit the width of the membrane taking into consideration areas that may need to be overlapped.
8) Determine the leading edge or section of the pattern that could have a variable width if desired.
9) This leading edge or section is drawn in a computer aided design program.
10) The drawing consists of a series of holes that media or granules will fit into to be applied/deposited onto the membrane. These holes can be round, hexagon, or of any shape for these drawings.
11) The drawing could consist of a die or stamp roll with an engraved pattern.
12) The drawings are made to scale with each drawing having the desired rows and a timing hole 56 used as a reference point as shown on FIG. 31.
13) This reference point 56 is important so that the design and pattern sections can be overlaid properly.
14) The product to be emulated is further broken down into different sections and each section is drawn in a computer aided design program. These drawings like the first section or leading edge is devised of a series of holes.
15) Using the computer aided design program place the different design sections into layers that can then be overlapped and viewed in a view window showing the different layers in an assembled view as shown on FIG. 31 that make the product to be emulated. Each layer can be a different color for ease of viewing the design pattern.
16) These layers can be turned on or off in the computer aided design program.
17) Determine the dimensions of the media to be used to make the design on the membrane. This is important as the cylinders used as pattern rolls must be drilled, embossed, inscribed, etc. so that the media will fit into the pattern holes and be applied/deposited onto the membrane.

18) Determine the cylinder diameter needed to make the design based on the design dimensions and criteria determined earlier.
19) The computer aided design program drawings are then given to a fabricator who machines the cylinders as drawn in the computer program drilling, embossing, and or inscribing the holes etc. in order to make the design pattern of choice.
20) Determine the color of the media to best emulate the product and give it a 3-D appearance as described previously in the body of the specification and briefly below.
21) Typically one edge or section of the design pattern will be lighter to show the sun striking and reflecting off of this section or edge. Darker colored media is usually used as the remaining pattern design outline and various color blends, shades and tones can be used to make the product appear three dimensional.
22) The cylinders with the pattern inscribed into the surface are placed into and near the bottom of a media or granule container called pattern applicator units or hoppers.
23) As the cylinders rotate media falls into the holes and excess media is removed prior to the media being applied/deposited onto the surface of the hot or tacky or semi molten membrane.
24) The cylinders are controlled by a computer program so that there is a reference point that corresponds to the timing or reference hole in the drawings.
25) The computer uses this reference point on each cylinder to speed or slow the rotational speed of the cylinders to keep them synchronized.
26) The leading edge or first section that has or can have a variable width is usually designated as the master pattern applicator roll.
27) The rest of the cylinders are designated as slave pattern applicator rolls.
28) Determine the timing holes or reference points for each cylinder to calculate when each pattern roll should apply/deposit the media on the surface of the membrane. This calculation is based on the position of the master pattern applicator roll and when the master pattern applicator roll applied/deposited the media on the surface of the membrane to time when the next slave pattern applicator roll and subsequent slave pattern applicator rolls should apply/deposit the media onto the sheet membrane taking into account the speed of the line, the rotational speed of the master pattern applicator roll, the timing hole location and the diameter of the cylinders.

An example of the disclosed process is:

selecting an apparatus comprising: a minimum of 2 applicator units comprising: a master applicator unit and a minimum of 1 slave applicator unit arranged in series with the master applicator unit; a pattern roll in the master applicator unit and each slave applicator unit wherein each pattern roll dispenses a selected design pattern section; all applicator units located above a structure; a material which all applicator units located above a structure; a material which passes over the structure and under each applicator unit located above the structure and the material; a material speed controller for the material passing under the applicator units; a master speed controller for the master applicator unit; a slave speed controller for each slave applicator unit; a reference point or timing hole created on each pattern roll for coordinating the speed controllers wherein the slave speed controller for each slave applicator unit is coordinated with the master speed controller for the master applicator unit;

selecting a product to emulate; considering the environment in which the product will be installed;

selecting a design for the product to be emulated;

selecting a material on which the design will be applied;

selecting a size, shape, and location of the selected design pattern section to be applied on the material by each of each applicator unit;

entering the design for the product including the size, shape, and location of the selected design pattern section to be applied by each applicator unit into a computer aided design program;

running the computer aided design program to create a pattern for each applicator unit; creating/inscribing the selected design pattern section on each pattern roll;

setting or programming the material speed controller, the master speed controller, and each slave speed controller;

loading each cylinder and with its intended application material to be applied/deposited into an applicable applicator unit; and running the material through the apparatus after all applicator units are loaded as desired.

In another embodiment the minimum of 2 applicator units in the apparatus further comprises at least 1 media applicator unit in series with the master applicator unit and the minimum of 1 slave applicator units. The apparatus can further comprise a speed controller for each media applicator unit which may be coordinated with the master controller if desired. An algorithm can be programmed to control each slave applicator unit based on a rotational speed of the master applicator unit, a diameter of the pattern applicator rolls, and a speed of the material.

The material on which a design is inscribed can be a construction material such as roofing and emulating a shingle. The construction material can have a selvage edge surfaced with a parting agent and an adhesive applied as desired for bonding to an adjacent surface after installation.

The above is a detailed description of particular embodiments of the invention. It is recognized that departures from the disclosed embodiments may be made within the scope of the invention and that obvious modifications will occur to a person skilled in the art. Those skilled in the art should, in light of the present disclosure, appreciate that many changes can be made in the specific embodiments which are disclosed herein and still obtain a like or similar result without departing from the spirit and scope of the invention. All of the embodiments disclosed and claimed herein can be made and executed without undue experimentation in light of the present disclosure.

We claim the following:

1. A 3-D pattern apparatus comprising:
    a minimum of 2 applicator units comprising a master applicator unit and a minimum of 1 slave pattern applicator unit arranged in series with the master applicator unit;
    a pattern roll in the master applicator unit and in each slave pattern applicator unit wherein each pattern roll dispenses a portion of a selected design pattern section;
    all the applicator units located above a structure;
    a material which passes over the structure and under each applicator unit located above the structure and the material;
    a material speed controller for the material passing under the applicator units;
    a master speed controller for the master applicator unit;

a slave speed controller for each slave pattern applicator unit;

a reference point created on each pattern roll for coordinating the master speed controller and each slave speed controller wherein the slave speed controller for each slave pattern applicator unit is coordinated with the master speed controller for the master applicator unit;

wherein each slave pattern applicator unit is synchronized with the master applicator unit to apply the portion of the selected design in a same area as applied by the master applicator unit; and further comprising a minimum of 2 slave pattern applicator units:

wherein the pattern is applied horizontally on the material allowing the width of the pattern to be varied.

2. The 3-D pattern apparatus according to claim 1 wherein a color and a shade of the design pattern applied by each applicator unit is variable to be compatible with the selected design pattern.

3. The 3-D pattern apparatus according to claim 1 wherein an algorithm that controls each slave pattern applicator unit is based on a rotational speed of the master applicator unit, a diameter of the pattern applicator rolls, and a speed of the material.

4. The 3-D pattern apparatus according to claim 1 wherein the material has a selvage edge surfaced with a parting agent.

5. The 3-D pattern apparatus according to claim 1 wherein the material has an adhesive applied for bonding to an adjacent surface.

6. The 3-D pattern apparatus according to claim 1 wherein the minimum of 2 applicator units further comprises a minimum of 1 media applicator unit in series with the master applicator unit and the minimum of 1 slave pattern applicator unit.

7. The 3-D pattern apparatus according to claim 6 further comprising a speed controller for each media applicator unit wherein the speed controller for each media applicator unit is coordinated with the master speed controller.

8. The 3-D pattern apparatus according to claim 6 further comprising a speed controller for each media applicator unit wherein the speed controller for each media applicator unit is not coordinated with the master speed controller.

9. The 3-D pattern apparatus according to claim 6 wherein an algorithm that controls each slave pattern applicator unit is based on a rotational speed of the master applicator unit, a diameter of the pattern applicator rolls, and a speed of the material.

10. The 3-D pattern apparatus according to claim 6 wherein a size and a sieve grading of a media applied by each media applicator unit is variable to be compatible with the selected design pattern.

11. The 3-D pattern apparatus according to claim 6 wherein a color and a shade of the design pattern applied by each applicator unit is variable to be compatible with the selected design pattern.

12. The 3-D pattern apparatus according to claim 6 wherein the at least 1 media applicator unit further comprises an engineering control mechanism to control an amount of media applied on the material.

13. The 3-D pattern apparatus according to claim 12 wherein the construction material has an adhesive applied to be compatible with bonding to an adjacent surface during installation.

14. The 3-D pattern apparatus according to claim 1 wherein the material is a construction material.

15. The 3-D pattern apparatus according to claim 14 wherein the construction material is roofing material.

16. The 3-D pattern apparatus according to claim 14 wherein the construction material has a selvage edge surfaced with a parting agent.

17. A 3-D design pattern process comprising:

selecting an apparatus comprising a minimum of 2 applicator units comprising a master applicator unit and a minimum of 1 slave pattern applicator unit arranged in series with the master applicator unit; a pattern roll in the master applicator unit and each slave pattern applicator unit wherein each pattern roll dispenses a portion of a selected design pattern section; all applicator units located above a structure; a material which passes over the structure and under each applicator unit located above the structure and the material; a material speed controller for the material passing under the applicator units; a master speed controller for the master applicator unit; a slave speed controller for each slave pattern applicator unit; and a reference point created on each pattern roll for coordinating the master speed controller and each slave speed controller wherein the slave speed controller for each slave pattern applicator unit is coordinated with the master speed controller for the master applicator unit; wherein each slave pattern applicator unit is synchronized with the master applicator unit to apply the portion of the selected design in a same area as applied by the master applicator unit; and further comprising a minimum of 2 slave pattern applicator units:

wherein the pattern is applied horizontally on the material allowing the width of the pattern to be varied;

selecting a material for an intended product;

selecting a design for the material for the product;

selecting a size, shape and location of a selected design pattern section to be applied on the material by each applicator unit;

entering the design for the product including the size, shape, and location of the selected design pattern section to be applied by each applicator unit into a computer aided design program;

running the computer aided design program to create a pattern for the selected design pattern section on each pattern roll on each applicator unit;

inscribing the selected pattern section on each pattern roll with the selected design pattern section generated by the computer aided design program;

loading each pattern roll with its intended application material to be deposited into an applicable applicator unit; and running the material through the apparatus after all applicator units are loaded as desired.

18. The 3-D pattern process according to claim 17 further comprising a minimum of 2 slave pattern applicator units.

19. The 3-D pattern process according to claim 18 wherein a color and a shade of the design pattern applied by each applicator unit is variable as desired for the selected design pattern.

20. The 3-D design pattern process according to claim 18 in which the minimum of 2 applicator units further comprises at least 1 media applicator unit in series with the master applicator unit and the minimum of 1 slave pattern applicator unit.

21. The 3-D design pattern process according to claim 20 further comprising selecting a media for each media applicator unit.

22. The 3-D design pattern process according to claim 21 further comprising loading the desired media selected into each media applicator unit.

23. The 3-D design pattern process according to claim 22 further comprising programming the master speed controller, and each slave speed controller.

24. The 3-D design pattern process according to claim 22 further comprising programming the material speed controller.

25. The 3-D pattern process according to claim 20 wherein a size and a sieve grading of the media applied by each media applicator unit is variable as desired for the selected design pattern.

26. The 3-D pattern process according to claim 20 wherein the at least 1 media applicator unit is further designed to control an amount of media applied on the material.

* * * * *